US011667152B2

(12) United States Patent
Solheim et al.

(10) Patent No.: US 11,667,152 B2
(45) Date of Patent: *Jun. 6, 2023

(54) COLLAPSIBLE WHEELS AND METHODS OF MAKING COLLAPSIBLE WHEELS

(71) Applicant: KARSTEN MANUFACTURING CORPORATION, Phoenix, AZ (US)

(72) Inventors: John A. Solheim, Phoenix, AZ (US); Eric V. Cole, Cave Creek, AZ (US); Neil J. Clark, Lincoln (GB)

(73) Assignee: Karsten Manufacturing Corporation, Phoenix, AZ (US)

( * ) Notice: Subject to any disclaimer, the term of this patent is extended or adjusted under 35 U.S.C. 154(b) by 291 days.

This patent is subject to a terminal disclaimer.

(21) Appl. No.: 16/934,995

(22) Filed: Jul. 21, 2020

(65) Prior Publication Data

US 2020/0346489 A1   Nov. 5, 2020

Related U.S. Application Data

(63) Continuation of application No. 16/206,679, filed on Nov. 30, 2018, now Pat. No. 10,717,320, which is a continuation of application No. 14/945,577, filed on Nov. 19, 2015, now Pat. No. 10,179,476, which is a continuation-in-part of application No. 14/337,640, filed on Jul. 22, 2014, now Pat. No. 9,981,501, which
(Continued)

(51) Int. Cl.
| *B60B 9/04* | (2006.01) |
| *B60B 19/04* | (2006.01) |
| *B60B 9/26* | (2006.01) |
| *B60B 25/00* | (2006.01) |
| *B60B 19/02* | (2006.01) |

(52) U.S. Cl.
CPC ............ *B60B 9/04* (2013.01); *B60B 9/26* (2013.01); *B60B 19/04* (2013.01); *B60B 25/00* (2013.01); *B60B 25/004* (2013.01); *B60B 19/02* (2013.01); *B60B 2320/10* (2013.01); *B60B 2320/50* (2013.01); *B60B 2340/30* (2013.01); *B60B 2900/313* (2013.01); *B60B 2900/351* (2013.01); *B60Y 2200/86* (2013.01); *Y10T 29/49513* (2015.01)

(58) Field of Classification Search
CPC .. B60B 9/04; B60B 9/26; B60B 19/04; B60B 25/00; B60B 25/002
See application file for complete search history.

(56) References Cited

U.S. PATENT DOCUMENTS

| 3,630,580 A | 12/1971 | Grawey |
| 4,408,646 A | 10/1983 | Forsyth |
(Continued)

FOREIGN PATENT DOCUMENTS

| AU | 2001291482 | 9/2001 |
| CN | 2461792 Y | 11/2001 |
(Continued)

OTHER PUBLICATIONS

International Search Report from corresponding PCT Application No. PCT/US2013/066843, dated Mar. 28, 2014.
(Continued)

*Primary Examiner* — Jason R Bellinger

(57) ABSTRACT

Embodiments of collapsible wheels and methods of making collapsible wheels are generally described herein. Other embodiments may be described and claimed.

20 Claims, 31 Drawing Sheets

Related U.S. Application Data is a continuation of application No. 14/063,601, filed on Oct. 25, 2013, now Pat. No. 8,833,864.

(60) Provisional application No. 61/719,634, filed on Oct. 29, 2012.

(56) References Cited

U.S. PATENT DOCUMENTS

| | | | |
|---|---|---|---|
| 4,602,823 | A | 7/1986 | Berg |
| 5,004,030 | A | 4/1991 | McLaughlin |
| 5,967,543 | A | 10/1999 | Taylor |
| 7,610,830 | B2 | 11/2009 | Serrano Gil |
| 8,011,736 | B2 | 9/2011 | Tan |
| 8,091,596 | B2 | 1/2012 | Louden |
| 8,371,659 | B2 | 2/2013 | Fitzsimons |
| 8,678,520 | B2 | 3/2014 | Sheu et al. |
| 8,833,864 | B2 | 9/2014 | Solheim et al. |
| 9,981,501 | B2 | 5/2018 | Solheim |
| 10,179,476 | B2 | 1/2019 | Solheim |
| 10,717,320 | B2 | 7/2020 | Solheim |
| 2015/0084398 | A1 | 3/2015 | Lee |

FOREIGN PATENT DOCUMENTS

| | | |
|---|---|---|
| CN | 102328717 | 1/2012 |
| CN | 2022443869 U | 5/2012 |
| CN | 104417251 | 3/2015 |
| DE | 102011103205 | 12/2012 |
| NZ | 531830 | 7/2005 |
| WO | 2004103794 | 2/2004 |
| WO | 2011004362 | 1/2011 |

OTHER PUBLICATIONS

Written Opinion from the International Searching Authority from corresponding PCT Application No. PCT/US2013/066843, dated Mar. 28, 2014.

International Search Report and Written Opinion of the International Searching Authority for International Application No. PCT/US2016/062101 filed Nov. 15, 2016.

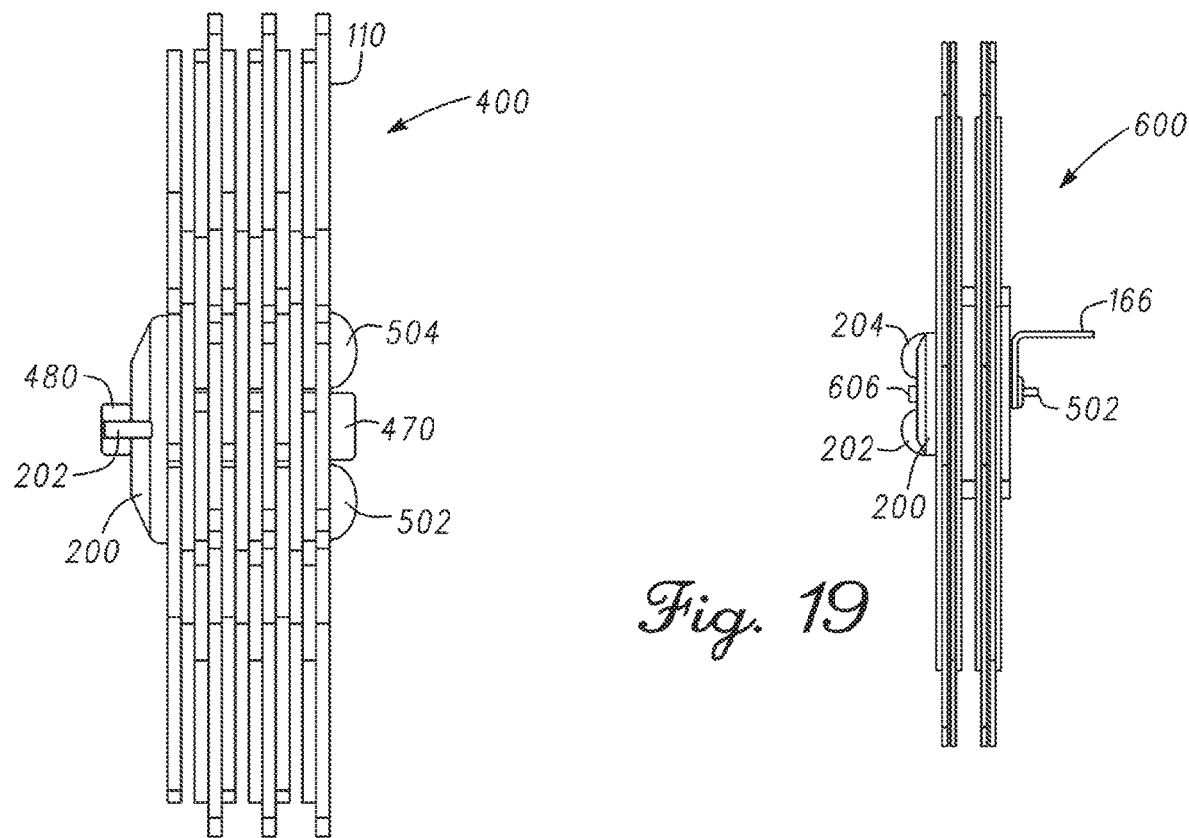
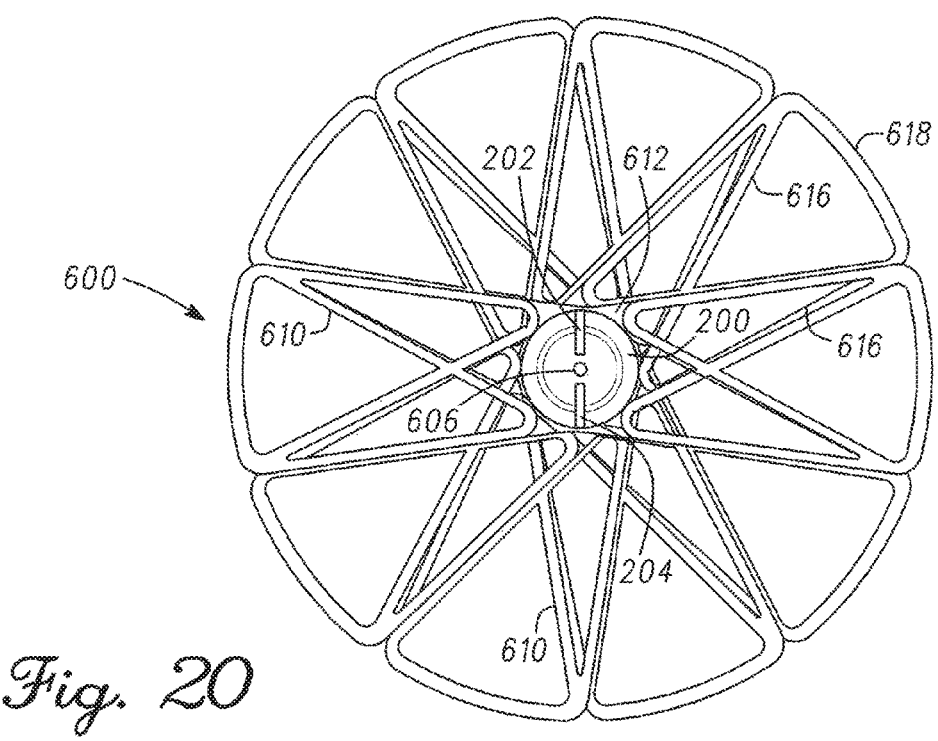

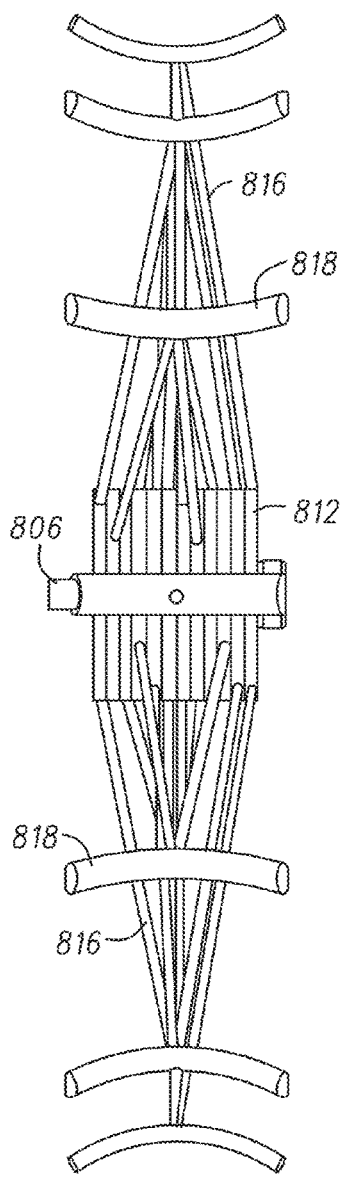
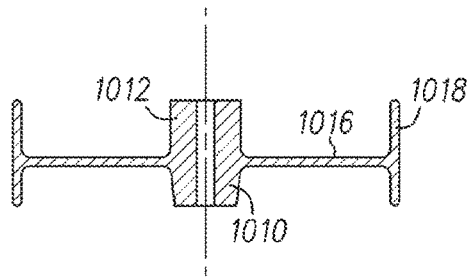
Fig. 26
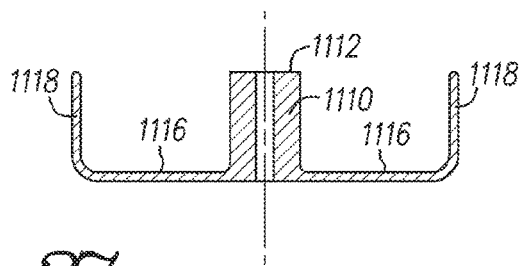
Fig. 27
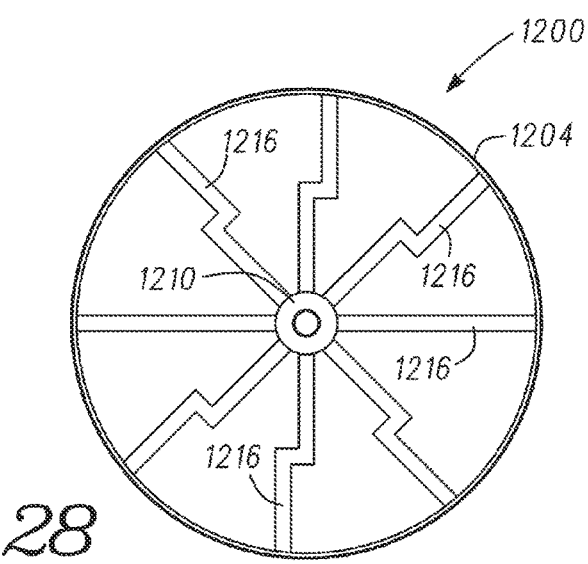
Fig. 25
Fig. 28

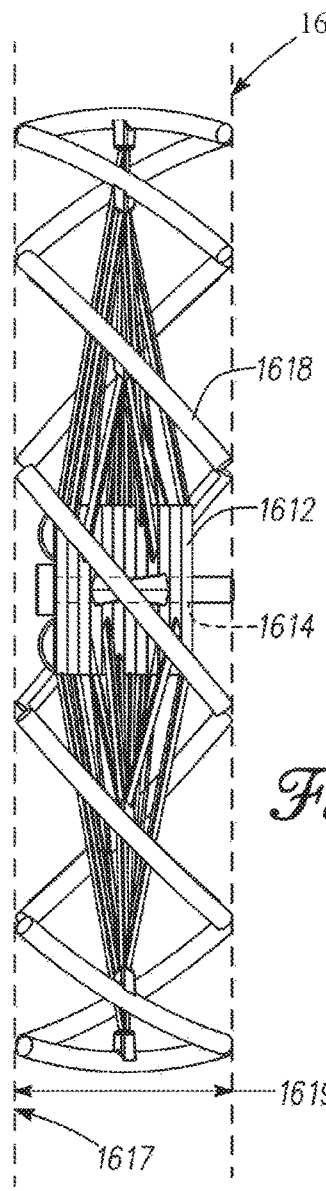
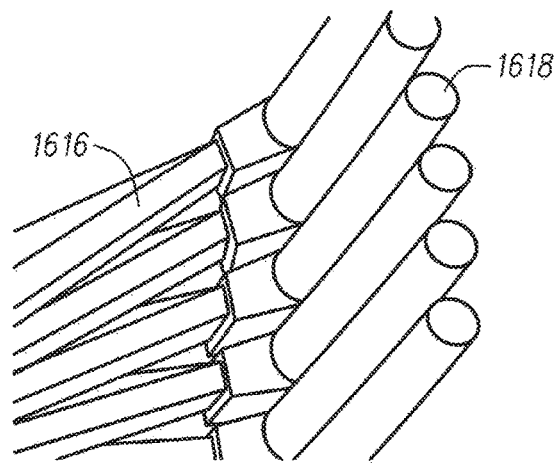
Fig. 39
Fig. 38
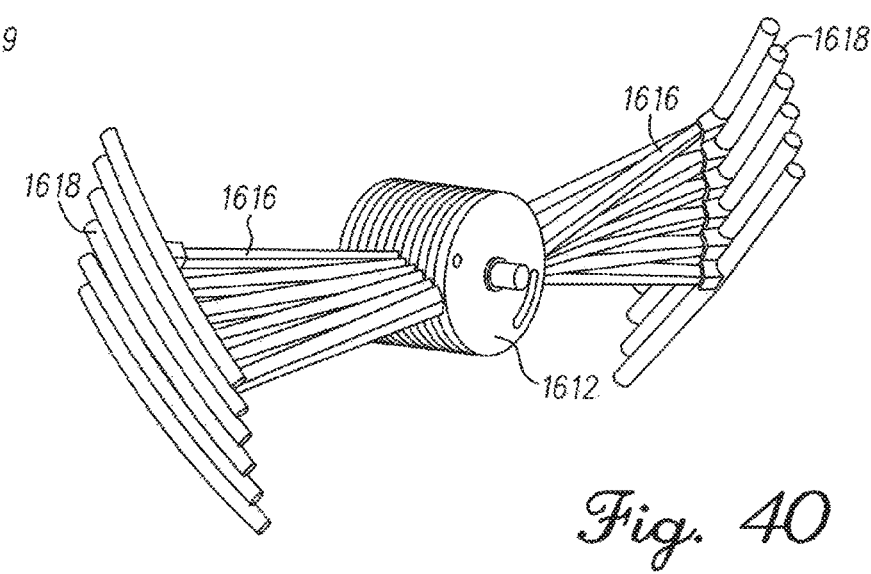
Fig. 40

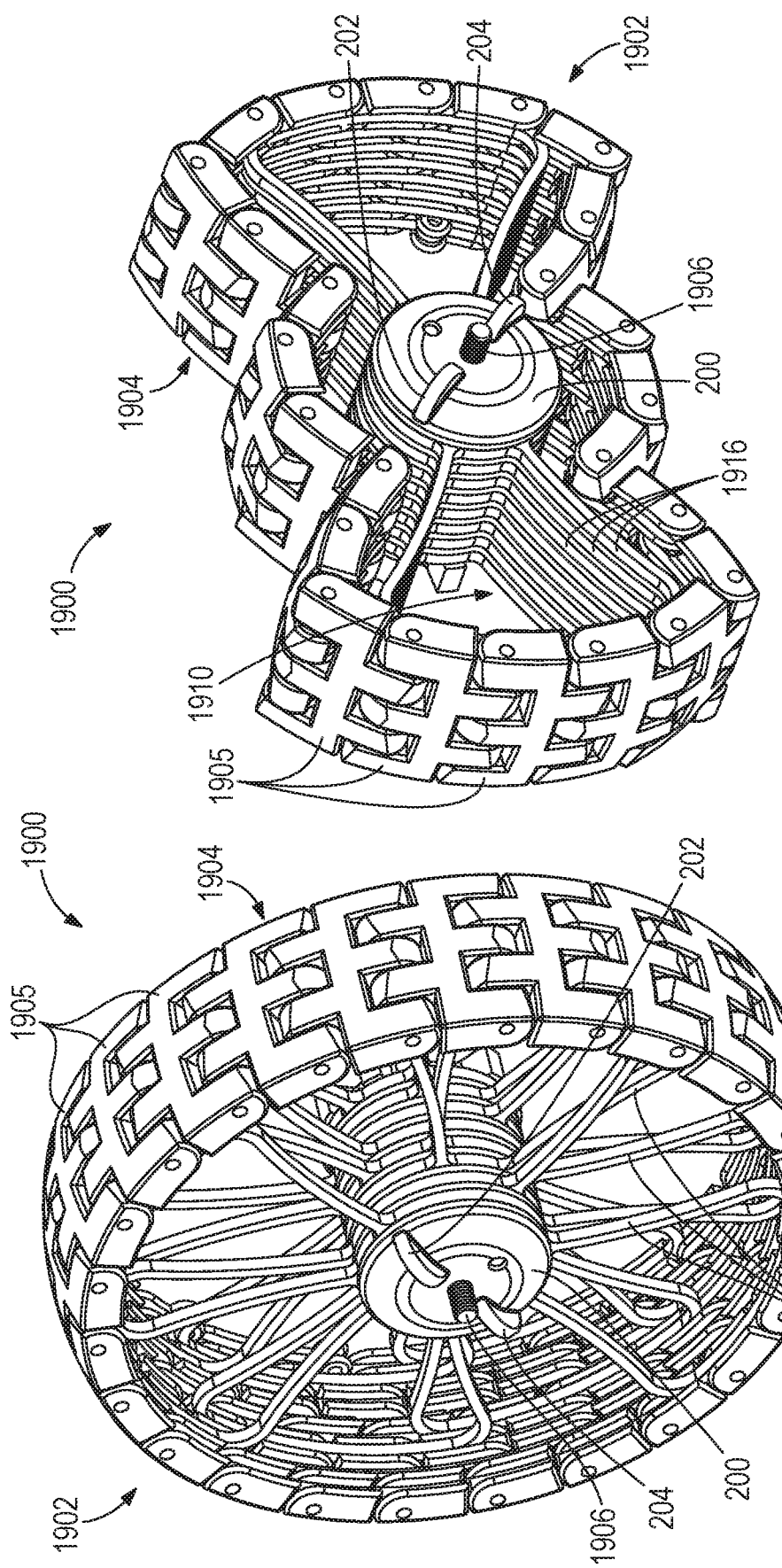

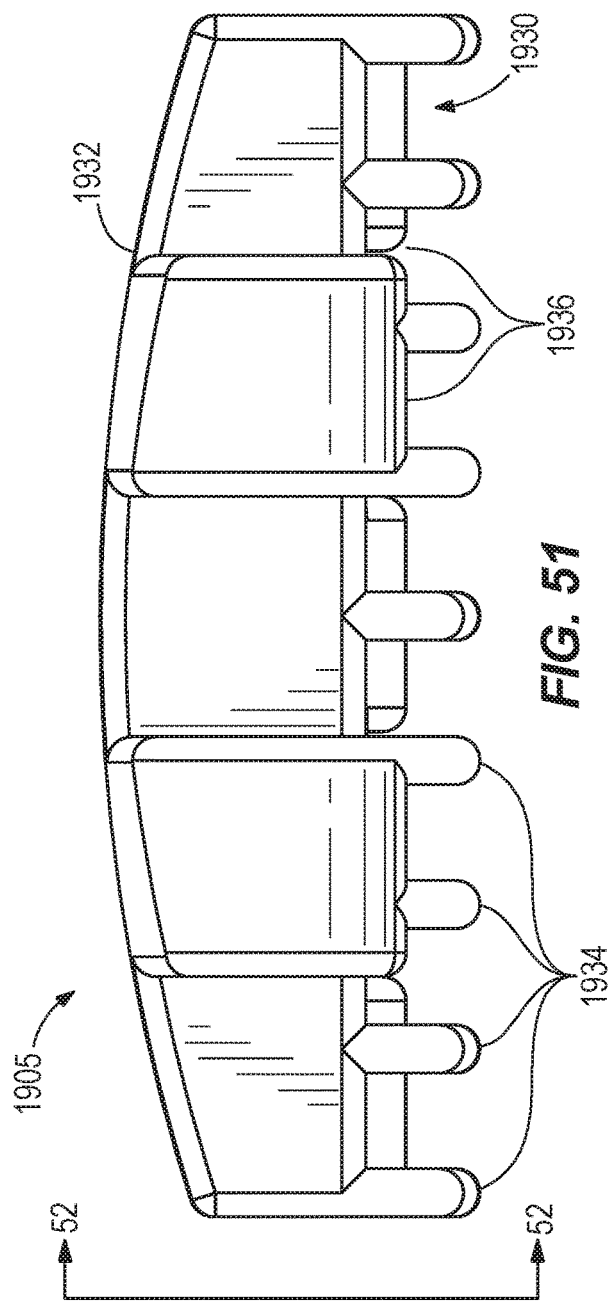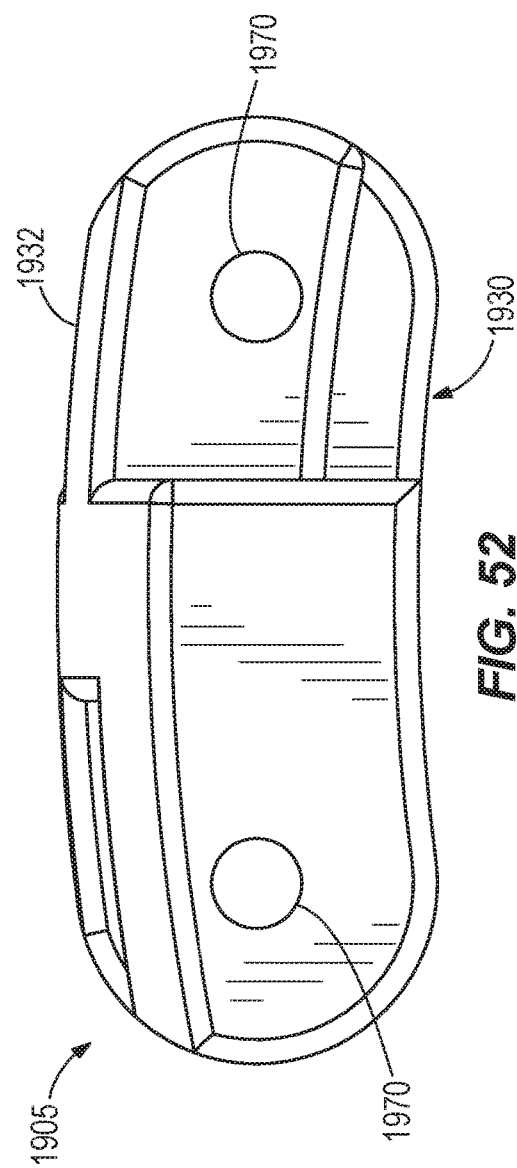

COLLAPSIBLE WHEELS AND METHODS OF MAKING COLLAPSIBLE WHEELS

RELATED APPLICATION

This is a continuation of U.S. patent application Ser. No. 16/206,679, filed Nov. 30, 2018 now U.S. patent Ser. No. 10/717,320, which is a continuation of U.S. patent application Ser. No. 14/945,577, filed Nov. 19, 2015, now U.S. Pat. No. 10,179,476, which is a continuation-in-part of U.S. patent application Ser. No. 14/337,640, filed on Jul. 22, 2014, now U.S. Pat. No. 9,981,501, which is a continuation of U.S. patent application Ser. No. 14/063,601, now U.S. Pat. No. 8,833,864, filed on Oct. 25, 2013, which claims the benefit of U.S. Provisional Patent Application Ser. No. 61/719,634, filed Oct. 29, 2012, the disclosures of all of which are herein incorporated by reference.

FIELD

The present application generally relates to wheels, and more generally to collapsible wheels and methods of making collapsible wheels.

BACKGROUND

Some sporting equipment may require a wheeled vehicle for transportation. For example, kayaks may be transported to a river or lake on a wheeled kayak cart. Prior to launching the kayak on water, the kayak cart is removed from the kayak and may be stored on the kayak. The kayak cart may have a frame that is collapsible to reduce the size of the cart when not in use. In another example, an individual playing golf can carry his golf bag on his shoulder, with a golf pull cart or an electric golf cart. Golf pull carts typically have a frame to which two wheels for moving the cart are attached. The frame may also include a handle that is held by an individual for balancing, pulling or pushing the cart, and a platform or base for mounting the individual's golf bag. The frame may be collapsible to reduce the size of the pull cart when not in use for storage and/or transportation.

BRIEF DESCRIPTION OF THE DRAWINGS

FIGS. 15-18 show the wheel of FIG. 1 with an expansion and collapsing mechanism according to one embodiment.

FIGS. 19 and 20 show a wheel according to another embodiment in an expanded position and a collapsed position, respectively.

FIGS. 23-25 show the wheel of FIGS. 21 and 22 in an expanded position.

FIG. 26 shows a side view of a wheel according to one embodiment.

FIG. 27 shows a side view of a wheel according to one embodiment.

FIGS. 28 and 29 show side views of a wheel according to one embodiment in the expanded position and the collapsed position, respectively.

FIGS. 35, 36 and 38 show a wheel according to one embodiment in an expanded position.

FIGS. 37, 39 and 40 show the wheel of FIG. 35 in a collapsed position.

FIG. 45 shows a perspective view of another embodiment of a wheel in an expanded position and having a track assembly.

FIG. 46 shows a perspective view of the wheel of FIG. 45 in a collapsed position.

FIG. 51 shows an end view of the track segment of FIG. 49, taken along line 51-51 of FIG. 49.

FIG. 52 shows a side view of the track segment of FIG. 49, taken along line 52-52 of FIG. 51.

DETAILED DESCRIPTION

Figure 1:
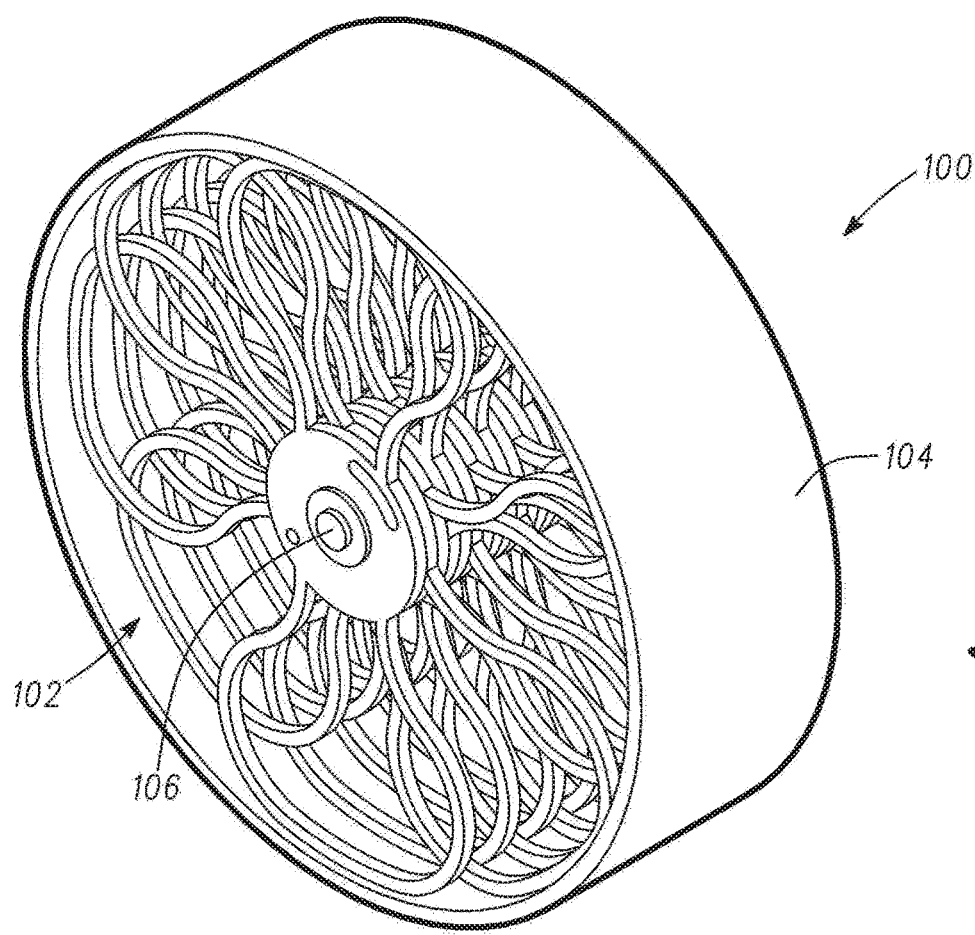
FIG. 1 is a perspective view of a wheel according to one embodiment shown in an expanded position.
Figure 2:
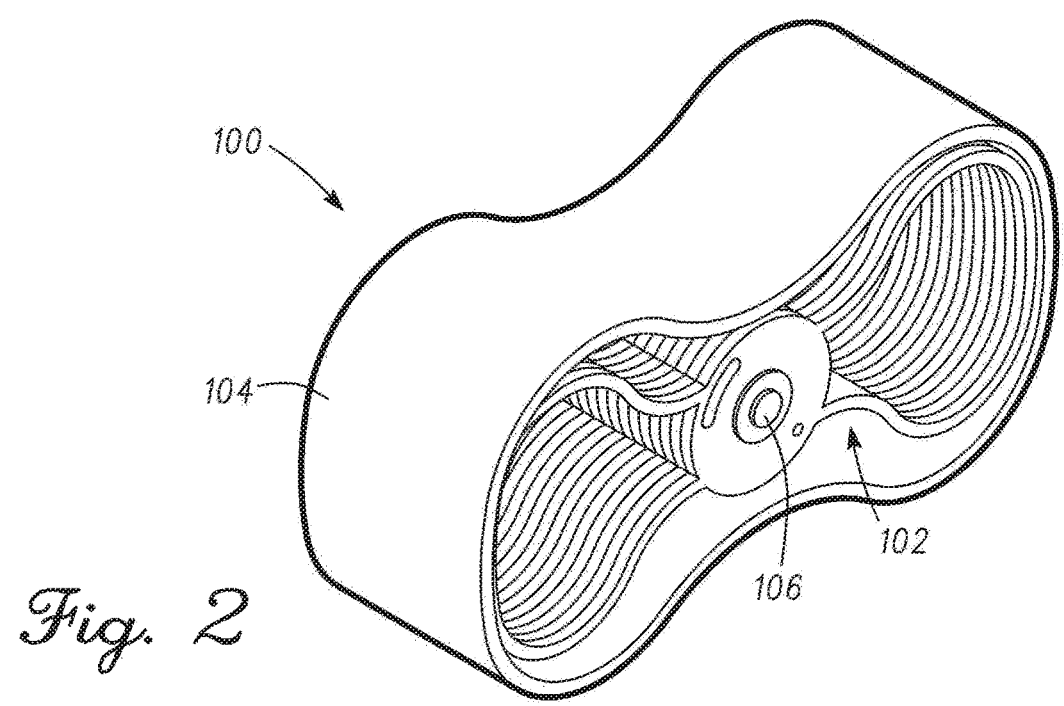
FIG. 2 is a perspective view of the wheel of FIG. 1 shown in a collapsed position.

Referring to FIGS. 1 and 2, a wheel 100 according to one example of the apparatus, methods, and articles of manufacture described herein is shown. The wheel 100 includes a hub assembly 102 and a tire 104, at least a portion of which is mounted around the hub assembly 102 for contact with the ground. The wheel 100 also includes an axle 106 over which the hub assembly 102 is rotatably mounted. A wheel 100 or a plurality of wheels 100 may be used on a cart or a vehicle for transporting any object.

FIG. 1 shows the wheel 100 in an expanded position. To reduce the size of the wheel 100 for transportation and/or storage, an individual may collapse the wheel 100 to a collapsed position shown in FIG. 2. For example, a trunk of an automobile may not have sufficient space to accommodate a pull cart for golf clubs when the wheels 100 of the pull cart are in the expanded position. By placing the wheels 100 in the collapsed position, the pull cart and the wheels 100 may fit inside the trunk of the automobile for transportation. Accordingly, collapsing the wheels from an expanded position to a collapsed position allows the wheels and or any object to which the wheels are attached to occupy less space. Furthermore, as discussed in detail below, each wheel 100 may be removable from a pull cart to further reduce the space that may be occupied by the pull cart and the wheels 100.

Referring also to FIGS. 3-6, the hub assembly 102 is shown in the expanded and collapsed positions, respectively. The hub assembly 102 includes a plurality stacked wheel sections 110. Each wheel section 110 includes a hub section 112 with a central bore 114. The wheel sections 110 may be concentrically stacked so that the central bores 114 are axially aligned to form an elongated bore for receiving the axle 106. Each wheel section 110 may include at least one spoke 116 and a rim 118. In the example of FIGS. 1-5, each wheel section 110 has a first pair of spokes 116 that radially projects from the hub section 112 to connect to a first rim 118, and a second pair of spokes 116 that radially projects from the hub section 112 opposite to the first pair of spokes 116 to connect to a second rim 118. Each rim 118 receives and supports a section of the tire 104. Each wheel section 110 may include any number of spokes 116 that extend from the hub section 112 to one or more rims 118. For example, each rim 118 may be connected to only one spoke 116 or a plurality of spokes 116. The spokes 116 may be in any shape. For example, each spoke 116 may be straight, bent in one or more locations along the length of the spoke, and/or have a curvature. In the examples of FIGS. 1-5, the spokes 116 may be curved so as to function as springs when the wheel 100 is used. Accordingly, when forces are exerted on the rim 118 during the operation of the wheel 100, the curved shape of each spoke 116 facilitates elastic bending of the spoke 116 such that the spoke 116 provides a shock absorbing function.

Figure 3:
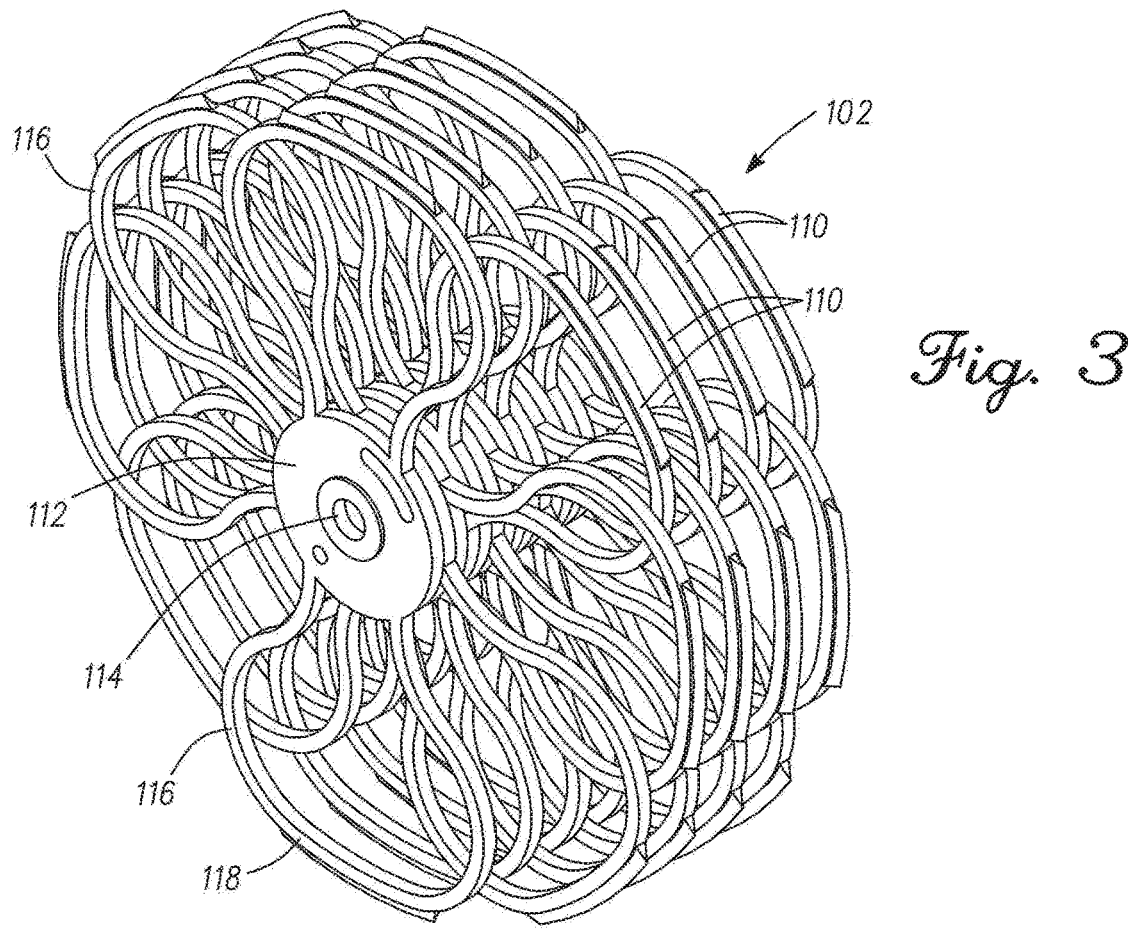
FIG. 3 is a perspective view of the wheel of FIG. 1 shown without a tire according to one embodiment.
Figure 4:
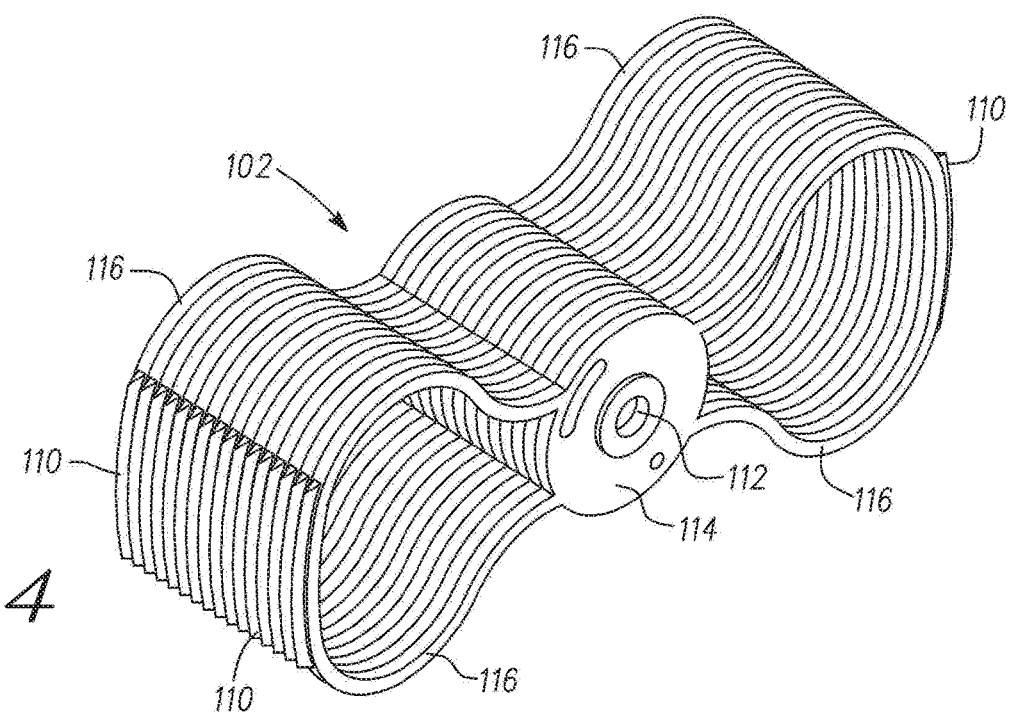
FIG. 4 is a perspective view of the wheel of FIG. 3 shown in the collapsed position.

Each wheel section 110 may be freely rotatable about the axle 106 to allow expansion of the wheel sections 110 from a collapsed position shown in FIG. 4 to an expanded position shown in FIG. 3. The number of wheel sections 110, the thickness of each wheel section 110, and/or the radial span of each wheel section 110 may be determined so that in the expanded position of the wheel 100, a full circular wheel, i.e., about 360°, is defined by the wheel 100 and the rims 118 provide sufficient support for the tire 104 for proper operation of the wheel 100. Providing sufficient support for the tire 104 at any instant during the operation of the wheel 100 may be defined by the number of contact points between the wheel 100 and the ground. Each rim 118 may be defined as having one contact point, which although referred to herein as a contact point, may represent an area of the rim 118 that contacts the ground. Increasing the number of contact points between the wheel 100 and the ground may increase the stability of the wheel 100, hence increase the stability of the vehicle, i.e., pull cart, to which the wheel 100 is attached.

Figure 5:
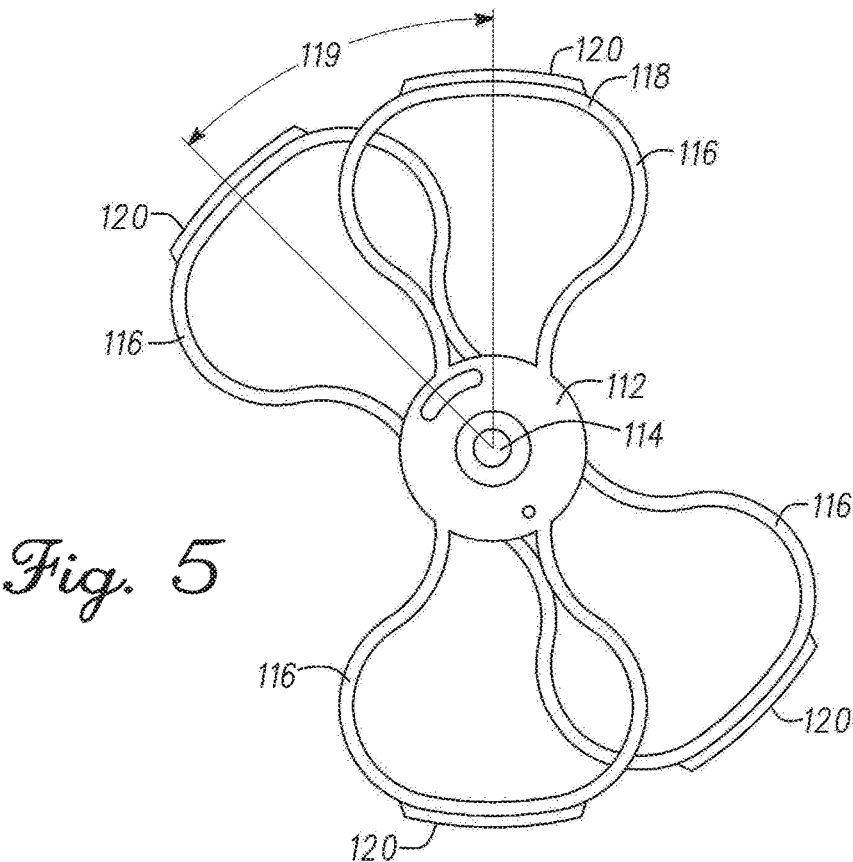
FIG. 5 is a perspective view of two wheel sections of the wheel of FIG. 1.

The radial span of each wheel section 110 may determine the radial position of each wheel section 110 relative to an adjacent wheel section 110 in the expanded position of the wheel 100 and the number of wheel sections 110 that may be needed. Radial span 119 as shown in FIG. 5 and as used herein may generally define a length of the rim 118 that contacts the ground during the operation of the wheel 100. For example, if each rim 118 of a pair of rims 118 of a wheel section 110 define a radial span of about 90°, only two wheel sections 110 may be required so that the rims 118 define a full circle or about 360° without generally any overlap or gap between two adjacent rims 118; or each rim 118 may generally define a 90° radial span on a full circle that defines the wheel 100. In other words, each wheel section 110 may generally define a 180° radial span on a full circle that defines the wheel. In another example, if each rim 118 of a pair of rims 118 of a wheel section 110 has a radial span 119 of about 45°, four wheel sections 110 may be required, i.e., eight rims 118, so that the rims 118 define a full circle or about 360° without generally any overlap or gap between two adjacent rims 118. Accordingly, a general configuration of the wheel 100 may be defined by the following example equation:

$$\frac{360°}{NW}C = R \tag{1}$$

Where W represents the number of wheel sections, N represents the number of opposing rims 118 on each wheel (e.g., N is 2 in the example of FIGS. 2-5), C represents the number of ground contact points, and R represents the radial spacing of each wheel section relative to an adjacent wheel section (in degrees).

As described above, increasing the number of contact points between the wheel 100 and the ground may increase the stability of the wheel 100. Each rim 118 may contact the ground at one contact point. By providing multiple contact points, i.e., multiple rims 118, which contact the ground at any instant, the stability of the wheel 100 may increase. In other words, increasing the number of contact points with the ground at any instant during the operation of the wheel 100 increases the width of the wheel 100, thereby increasing the number of wheel sections 110 that may be used to form the wheel 100.

Referring to FIG. 5, an example of the wheel 100 is shown where each wheel section has a rim 118 that has a radial span 119 of about 45°. Accordingly, adjacent wheel sections 110 may be generally radially spaced apart by about 45° in the expanded position of the wheel 100 as shown in FIG. 5. In the example of FIG. 5, four wheel sections 110, i.e., eight rims 118, would be required to define a full circle or about 360°. Thus, if the wheel 100 is constructed with four wheel sections 110, only one rim 118, i.e., one contact point, contacts the ground at any instant. To increase the stability of the wheel 100, sixteen wheel sections 110 may be provided as shown in the example of FIG. 4 so that at any instant during the operation of the wheel 100, four contact points on the wheel 100 contact the ground, i.e., four rims 118 define the width of the wheel 100. Any number of wheel sections 110 may be provided for increasing or reducing contact points. For example, twenty wheel sections 110 would provide five contact points with the ground at any instant for the wheel 100. In another example, twelve wheel sections 110 would provide three contact points with the ground. According to the above, when each rim 118 spans about 45°, at least eight rims 118 may be required so that at any instant during the operation of the wheel 100 one contact point contacts the ground. To increase the number of contact points along the width of the wheel when each rim 118 has a radial span 119 of about 45°, multiples of four wheel sections 110 may be provided. In the example of FIG. 4, sixteen wheel sections 110 for the wheel 100 provide four contact points at any instance during the operation of the wheel as shown in FIG. 6.

Increasing the number of wheel sections 110 may increase the stability of the wheel 100 and/or the amount of weight that the wheel 100 may support. However, increasing the number of wheel sections 110 may also increase the size and/or the weight of the wheel 100 in the collapsed position. Accordingly, the size of each wheel section 110, and other properties of each wheel section 110 as described herein may be determined depending on the size and load of the cart to which one or more wheels 100 may be attached.

Figure 6:
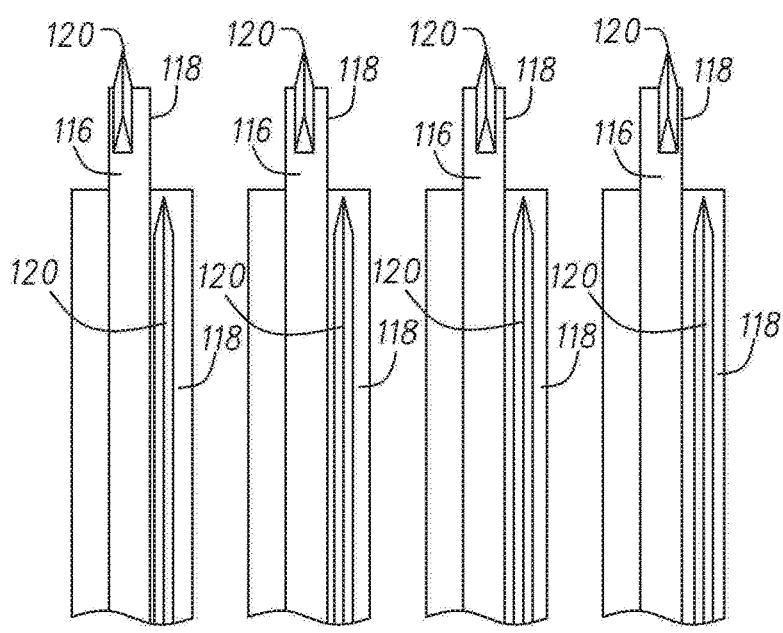
FIG. 6 is a partial front perspective view of the wheel of FIG. 1 shown in the expanded position.
Figure 7:
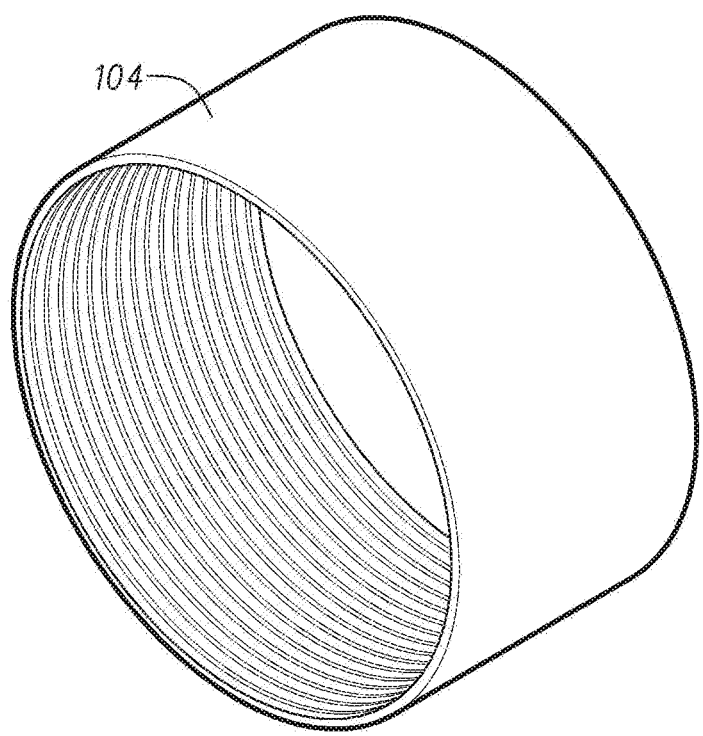
FIG. 7 shows a tire for use with a wheel according to one embodiment.
Figure 8:
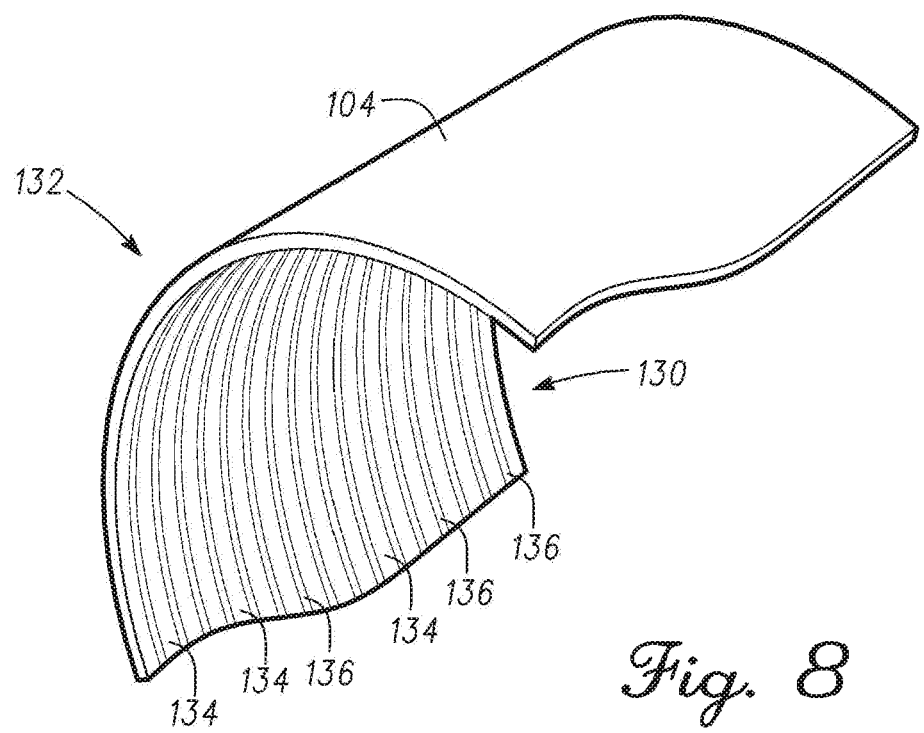
FIGS. 8-9 show sections of the tire of FIG. 7.
Figure 9:
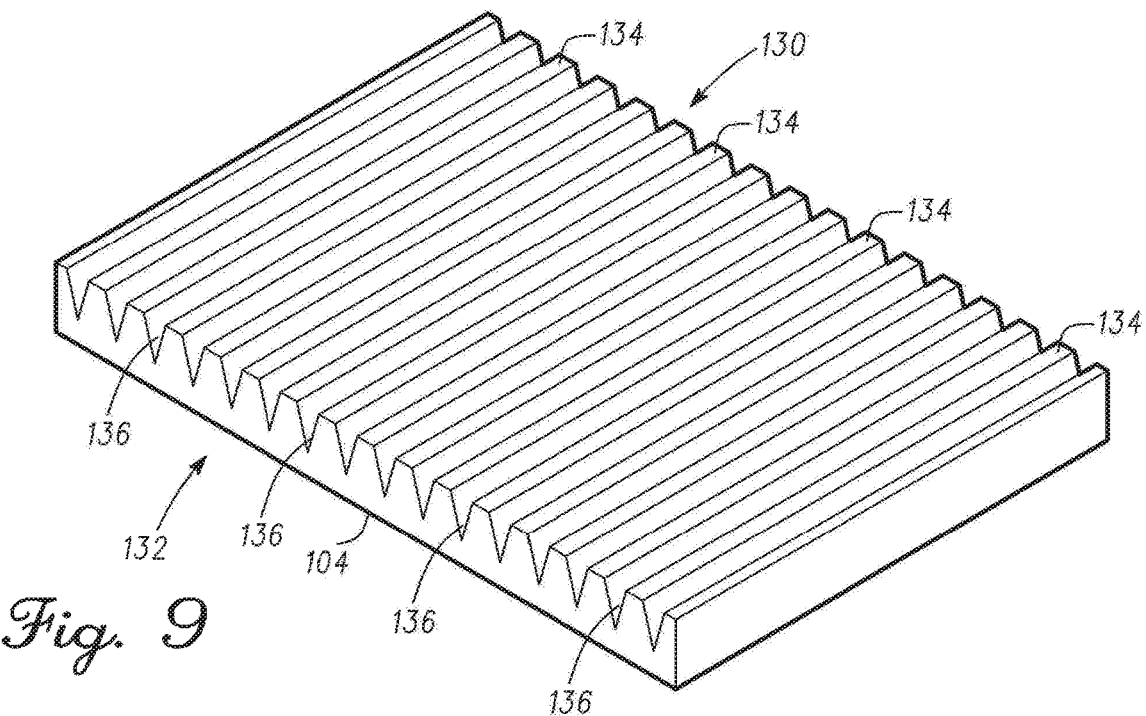

FIG. 6 illustrates an expanded position of two wheel sections 110. The rim 118 of each wheel section 110 includes a radial projection 120. Referring to FIGS. 7-11, the tire 104 may include an inner surface 130 and an outer surface 132. The outer surface 132 may be smooth or have treads. The inner surface 130 may have any configuration to provide mounting of the tire 104 on the rims 118. In the examples of FIGS. 8 and 9, the inner surface 130 includes a plurality of generally parallel ribs 134 that define a plurality of generally parallel grooves 136 between the ribs 134. The ribs 134 and the grooves 136 may radially span a portion of the inner surface 130. In the examples of FIGS. 8 and 9, the ribs 134 and the grooves 136 span the entire 360° of the inner surface 130 of the tire 104.

Figure 10:
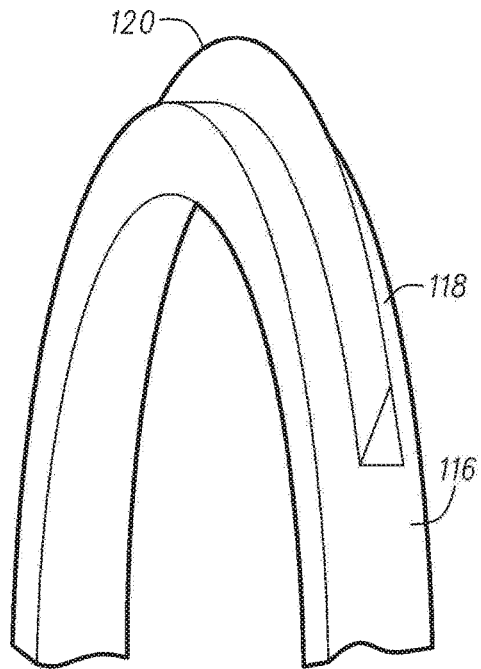
FIGS. 10-11 show mounting of the tire of FIG. 7 on the wheel of FIG. 3 according to one embodiment.
Figure 11:
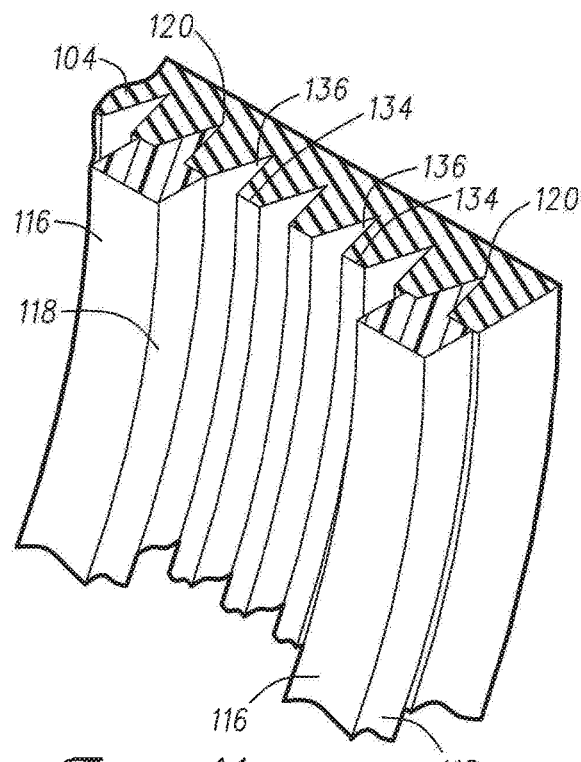

Referring to FIGS. 10 and 11, the distance between adjacent grooves 136 generally corresponds to the distance between the projections 120 of adjacent wheel sections 110. Additionally, the cross-sectional shape of each groove 136 may generally correspond to the cross-sectional shape of the projections 120. Accordingly, when the tire 104 is mounted on the wheel sections 110, the projections 120 may engage the grooves 136 and generally fit within the grooves 136. The projections 120 and the grooves 136 may have any cross-sectional shape. In the example of FIG. 11, the projections 120 are shown to have a generally triangular cross-sectional shape and the grooves 136 are also shown to have a generally corresponding triangular cross-sectional shape. Furthermore, the size of the grooves 136 may generally correspond to the size of the projections 120. For a tire 104 that is constructed from an elastic material such as rubber, the grooves 136 may be alternatively formed to be smaller than the projections 120 so that the grooves 136 elastically expand when receiving the projections 120 to provide a generally formfitting engagement with the projections 120. The tire may be attached to one or more of the rims 118 such that the tire is maintained in a mounted configuration on the wheel 100 in both the collapsed and expanded positions of the wheel 100.

As described above, each wheel section 110 may be positioned relative to an adjacent wheel section 110 at a certain angle during the operation of the wheel 100 to provide a sufficient number of contact points and generally evenly distributed contact point locations for the wheel 100. For example, the wheel sections 110 of FIG. 5 are positioned at about 45° relative to each other in the expanded position to provide four evenly distributed contact points at any instant during the operation of the wheel 100. The angle between the wheel sections 110 in the expanded position that provides a sufficient number of contact points and generally evenly distributes the contact point locations on the wheel may be referred to herein as the expansion angle. The expansion angle is shown in equation (1) as the variable R. Thus, the expansion angle for the example of FIG. 5 is about 45°.

Figure 12:
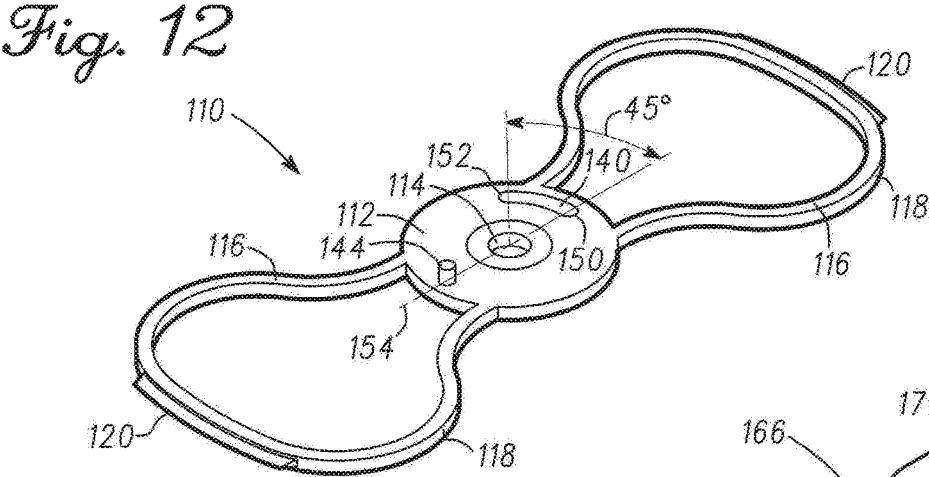
FIG. 12 shows a wheel section of the wheel of FIG. 1.

As described in detail above and with respect to equation (1), the expansion angle may be different depending on the configuration and/or properties of the wheel sections 110. To limit the expansion of the wheel sections 110 relative to each other and/or to provide positioning of the wheel sections 110 relative to each other at the expansion angle, the wheel 100 may include an expansion angle limiting mechanism by which rotation of each wheel section 110 relative to an adjacent wheel section 110 is limited to the expansion angle. According to one example shown in FIG. 12, the angle limiting mechanism includes a radial slot 140 on the hub section 112 of each wheel section 110 and a pin 144 that may be located on the hub section 112 opposite to the slot 142 relative to the central bore 114. The arc length of each radial slot 140 may be generally no greater than the expansion angle. In the example of FIG. 12, the arc length of the radial slot 140 is about 45°, which is the same as the expansion angle. When the wheel sections 110 are assembled as described in detail below, i.e., stacked on top of each other, the pin 144 of each wheel section 110 is placed inside the slot 140 of an adjacent wheel section 110. Accordingly, when adjacent wheel sections are rotated relative to each other, the pin 144 moves in the slot 140. However, the radial movement of the pin 144, which defines the radial movement of the wheel section 110 having the pin 144, is bound by the arc length of the slot 140.

Each slot 140 includes a first end 150 and a second end 152. In the collapsed position of the wheel 100, the pin 144 of each wheel section 110 is located near the first end 150 of the slot 140 of an adjacent wheel section 110. As the wheel 100 is expanded, the pin 144 moves in the slot 140 from the first end 150 until the pin 144 contacts the second end 152 of the slot 140. Thus, the slot 140 limits rotation of the two adjacent wheel sections 110 relative to each other to the expansion angle or the radial arc length of the slot 140. The position of each slot 140 and pin 144 may be determined to allow expanding and collapsing of the wheel 100 as disclosed. In the example of FIG. 12, the first end 150 of the slots 140 is generally located along a center longitudinal axis 154 of the hub section 112. Accordingly, the second end 152 of the slot 140 is located about 45° from the first end 150.

The pin 144 is also located on the center longitudinal axis 154, but is located opposite to the first end 150 of the slot 140 relative to the central bore 114. As described in detail below, the arrangement of the pin 144 and the slot 140 as shown in FIG. 12 provides for each wheel section 110 to be rotated relative to an adjacent wheel section by the expansion angle.

After the wheel 100 is expanded, which is defined by each wheel section 110 having the expansion angle relative to an adjacent wheel section 110, the wheel 100 may be maintained in the expanded position by any type of latching, locking and/or similar mechanisms that prevent the wheel sections 110 from rotating relative to each other. For example, each wheel section 110 may include an aperture (not shown) positioned on the hub section 112 such that when the wheel sections 110 are in the expanded position of the wheel 100, all of the apertures of the wheel sections 110 are generally aligned to receive a rod (not shown). Therefore, the rod prevents the wheel sections 110 from rotating relative to each other. In another example, a U-shaped bracket (not shown) which has a width that is generally similar to the collective width of the hub sections 112 may be placed over the hub sections 112 to prevent the hub sections 112 from rotating relative to each other.

Figure 13:
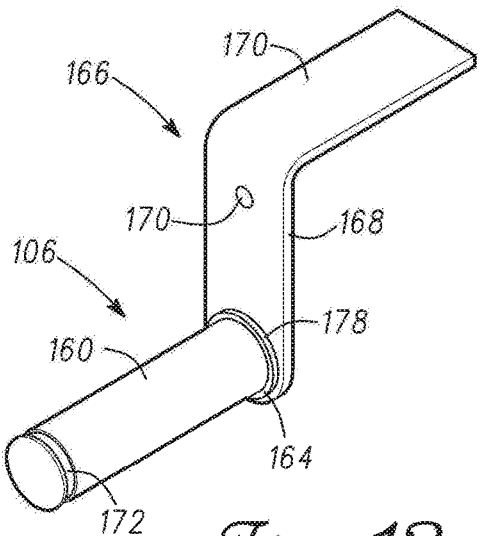
FIG. 13 shows an axle for the wheel of FIG. 1.
Figure 14:
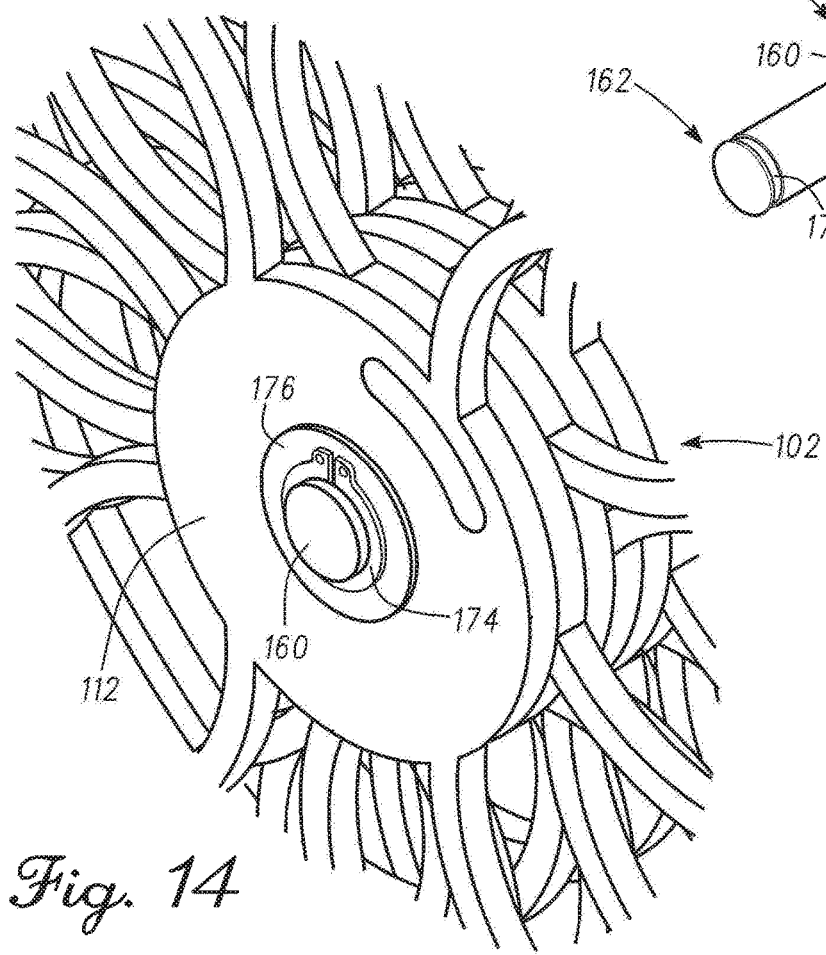
FIG. 14 shows the axle of FIG. 13 mounted in the wheel of FIG. 1.

Referring to FIGS. 13 and 14, the wheel sections 110 may be rotationally mounted on an axle 106. The axle 106 may be defined by a cylindrical shaft 160 having a first end 162 and a second end 164. In the example of FIGS. 13 and 14, the axle 106 may further include a mounting bracket 166 having a first bracket section 168 and the second bracket section 170. The mounting bracket 166 may facilitate mounting or attachment of the wheel 100 to a cart, such as a golf pull cart. The wheel sections 110 may be mounted on the shaft 160 by inserting the shaft 160 from the first end 162 in the central bore 114 of each wheel section 110. The axle 106 may include a mechanism by which the first wheel section 110 that is mounted on the shaft 160 is held stationary to allow expansion of the wheel 100 from a collapsed position. In one example as shown in FIG. 13, the first bracket section 160 includes a pinhole 170 for receiving the pin 144 of the first mounted wheel section 110. Engagement of the pin 144 in the pinhole 170 of the first mounted wheel section 110 maintains the first mounted wheel section 110 fixed to the first bracket section 160 to allow expansion of the wheel 100 from a collapsed position to an expanded position. After the wheel 100 is expanded, the pin 144 may be removed from the pinhole 170 to allow rotation of the wheel 100 about the shaft 160.

Figures 21, 22:
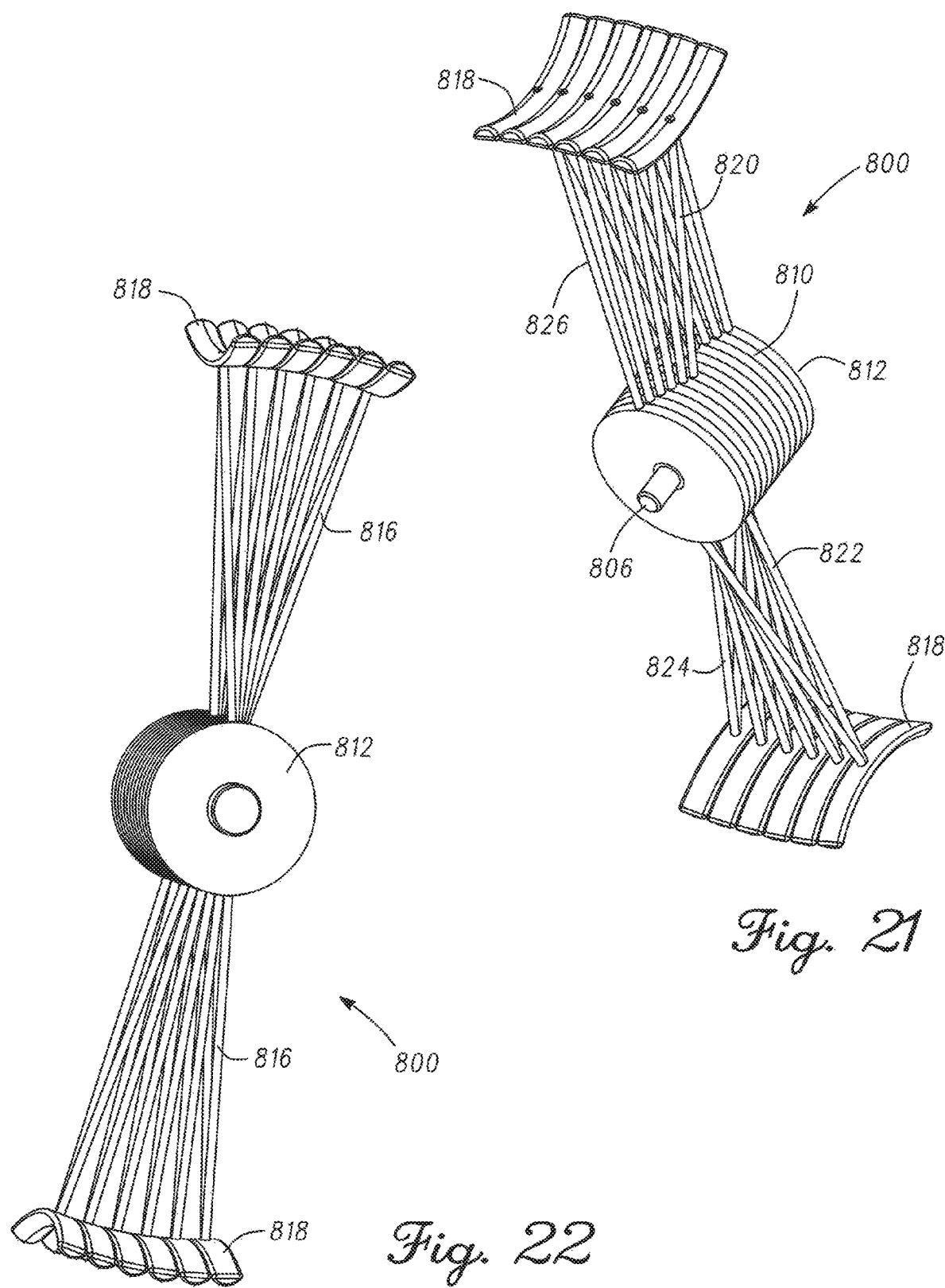
FIGS. 21 and 22 show a wheel according to another embodiment in a collapsed position.

The axle 106 may further include a wheel holding mechanism by which the wheel 100 is maintained on the shaft 160 during the operation of the wheel 100. The wheel holding mechanism may include any configuration to prevent the wheel 100 from sliding off the shaft 106 or being removed from the shaft 106 during the operation of the wheel 100. For example, the first end 162 of the shaft 160 may be threaded to receive a correspondingly threaded nut (an example is shown in FIG. 22). The threaded nut increases the diameter of the shaft 160 at the first end 162 to a diameter that is greater than the central bores 114 of the hub sections 112. Accordingly, the wheel sections 110 are stopped by the nut when reaching the first end 162 of the shaft 160.

In the example of FIG. 13, the shaft 160 includes an annular recess 172 at or near the first end 162 of the shaft 160. As shown in FIG. 14, after the wheel sections 110 are mounted on the shaft 160, a spring clip 174 may be mounted over and pressed onto the shaft 160 so that the spring clip 174 snaps into and remains in the annular recess 172. The spring clip 174 increases the diameter of the shaft 160 at the first end 162 to a diameter that is greater than the diameters of the central bores 114 of the hub sections 112. Accordingly, the wheel sections 110 are stopped by the spring clip 174 when reaching the first end 162 of the shaft 160. The axle 106 may also include a washer 176 or the like mounted between the spring clip 174 and the last mounted wheel section 110. To provide easier installation of the spring clip 174 into the annular recess 174, the first end 162 of the shaft may be tapered as shown in FIGS. 13 and 14 so that pressing the spring clip 174 onto the first end 162 gradually expands the spring clip 172 when being mounted on to the shaft 160. Thus, the spring clip 174 remains engaged in the annular recess 172 until it is expanded with or without a tool by an individual for removal of the spring clip 174 from the shaft 160, which then allows removal of the wheel sections from the shaft 160. At the second end 164 of the shaft 160 an annular shoulder 178 may be provided so that the first mounted wheel section 110 is spaced from the first bracket section 168.

FIG. 2 shows the wheel 100 in the collapsed position having the tire 104 mounted thereon. The tire 104 may be constructed from an elastic material such as rubber. Furthermore, the inner diameter of the tire 104 may be smaller than an outer diameter of a circle defined by the wheel 100 in the expanded position. Accordingly, the tire may be easily mounted over the wheel 100 in the collapsed position. However, the tire 104 may elastically expand when the wheel 100 is expanded. The elastic expansion of the tire 104 may create a restoring force in the tire 104 by which the tire 104 is pressed onto the rims 118 (for example the projections 120 are pressed in the grooves 136) to maintain the tire 104 on the wheel 100 during the operation of the wheel 100.

Figure 15:
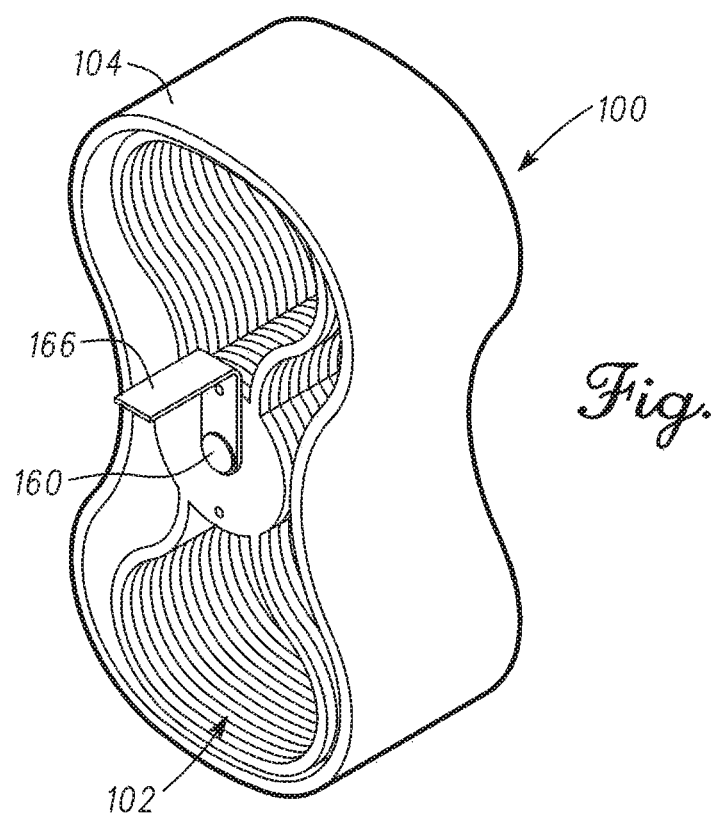
Figure 16:
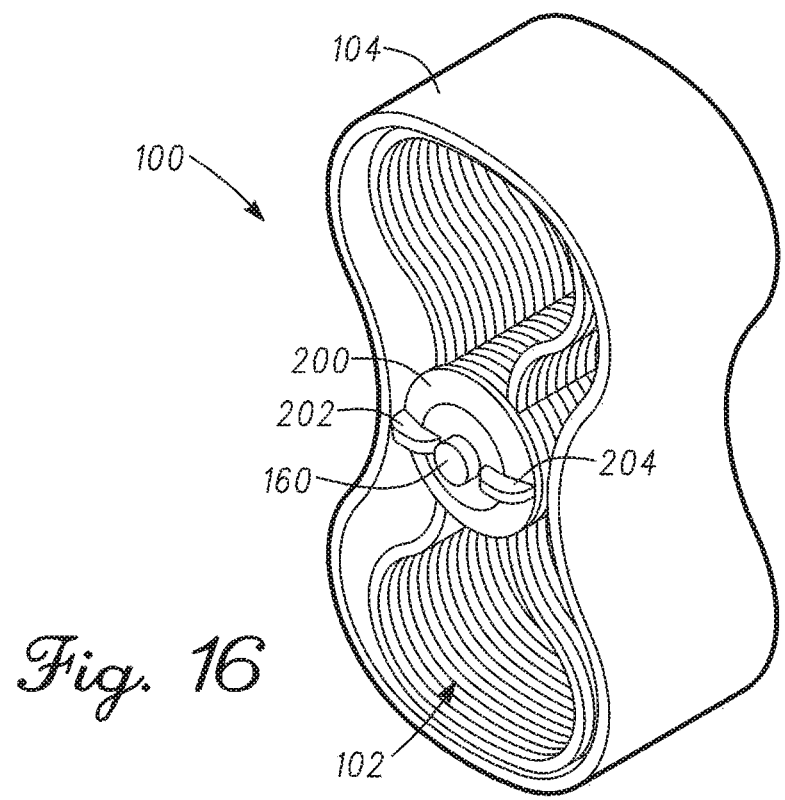

To expand the wheel 100 from a collapsed position to the expanded position, each of the wheel sections 110 may be rotated by hand. In one example shown in FIGS. 15 and 16, the wheel 100 includes a hubcap 200 by which the wheel sections 110 may be rotated relative to each other to expand the wheel 100. The hubcap 200 may include two opposing handles 202 and 204 that can be held by an individual for rotating the hubcap 200. The hubcap 200 may include a pin (not shown) on an inner surface thereof that may engage inside the slot 140 of the last mounted wheel section 110. The hubcap 200 may be rotationally mounted on the shaft 106. Accordingly, when the hubcap 200 is turned about the shaft 106 by an individual, the pin on the inner surface of the hubcap 200 moves in the slot 140 of the first wheel section 110 until the pin engages the second end 152 of the slot 140. After the first wheel section 110 is turned at the expansion angle, the pin 144 of the first wheel section 110 engages second end 152 in the slots 140 of the second wheel section 110 as described above. Accordingly, further rotation of the hubcap 200 causes the second wheel section 110 to rotate relative to the third wheel section 110 at the expansion angle. Continuing the rotation of the hubcap 200 rotates the remaining wheel sections 110 until the wheel 100 is completely expanded. The hubcap of 200 may be mounted on the shaft 160 between the last mounted wheel section 110 and the spring clip of 174. When holding the handles 202 and 204, an individual can also hold the second bracket section 166 to provide leverage when expanding the wheel 100.

Figure 17:
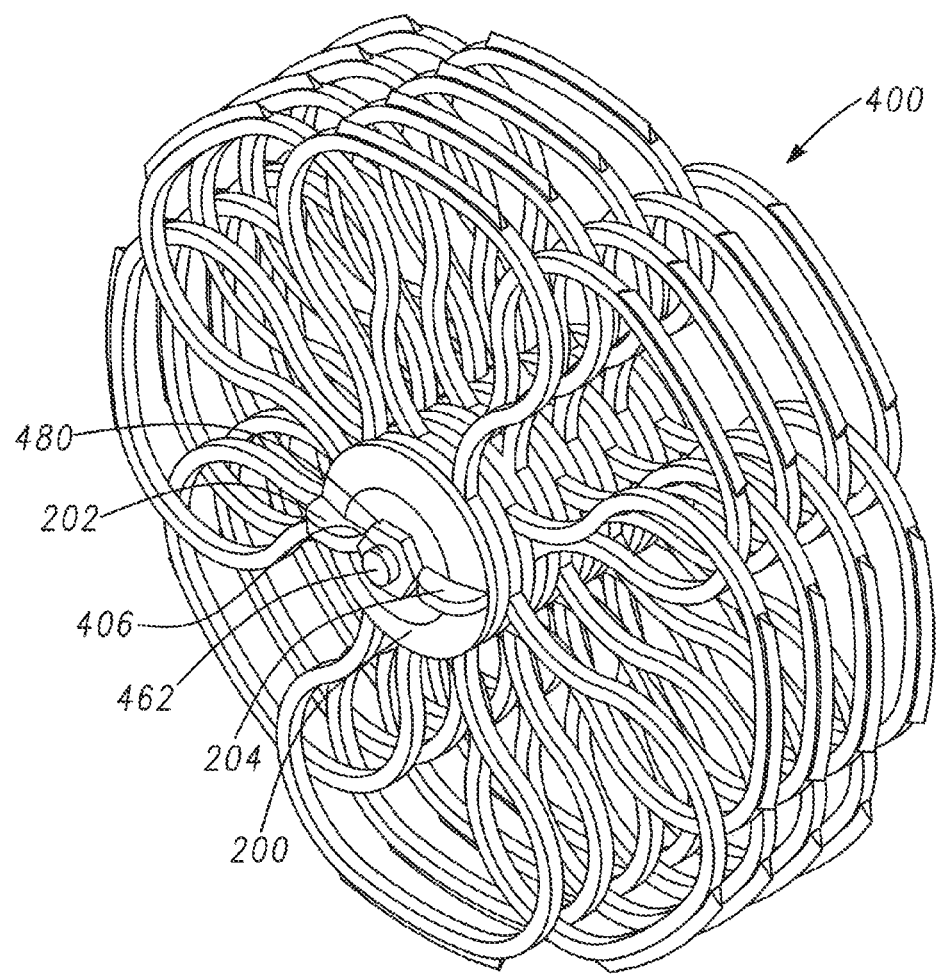

FIGS. 17 and 18 show a wheel 400 according to another example. The wheel 400 is similar in certain aspects to the wheel 100. Accordingly, similar parts of the wheel 100 and the wheel 400 are referred to with the same reference numbers. The wheel 400 includes a plurality of wheel sections 110 that are mounted on an axle 406 (shown in FIG.

17). The axle 406 includes a first end 462 (shown in FIG. 17) and a second end (not shown). The axle 406 receives the wheel sections 110 by being inserted into the central bores 114 of the wheel sections 110. The second end of the axle 406 includes a base 470 that is larger in diameter than the diameter of the central bore 114 of the wheel sections 110. Accordingly, when the wheel sections 110 are mounted on the axle 406, the wheel sections 110 are bound at the second end of the axle by the base 470. To prevent the wheel sections 110 from being removed from the axle 406 during the operation of the wheel 400, the first end 462 of the axle 406 may be threaded to receive a correspondingly threaded nut 480. Thus, tightening the nut 480 on threaded first end 462 of the axle 406 prevents the wheel sections 110 from being removed from the axle 406 during the operation of the wheel 400. Alternatively, the wheel 400 may include a wheel holding mechanism similar to the wheel holding mechanism of the wheel 100 as described in detail above. The wheel 400 includes a hubcap 200 which may be used to expand the wheel 400 from the collapse position to the expanded position as described in detail above with respect to the wheel 100.

Referring to FIG. 18, the first mounted wheel section 110 may include two opposing handles 502 and 504 on the central hub section 112 that are positioned similarly to the handles 202 and 204 of the hubcap 200. Accordingly, an individual can expand the wheel 400 from the collapsed position by holding the handles 202 and 204 with one hand and rotating the handles 202 and 204 in one direction and holding the handles 502 and 504 with the other hand and rotating the handles 502 and 504 in the opposite direction to rotate the wheel sections relative to each other to expand the wheel 400 to the expanded position. The handles 502 and 504 may be part of a hubcap (not shown) that is mounted on the axle 406 before the first mounted wheel section 110 is mounted on the axle 406. Alternatively as shown in FIGS. 17 and 18, the handles 502 and 504 may be an integral part of the first mounted wheel section 110.

Referring to FIGS. 19 and 20, a wheel 600 according to another embodiment is shown. The wheel 600 is similar in some aspects to the wheels 100 and 400. Accordingly, similar parts of the wheels 100, 400 and 600 are referred to with the same reference numbers. The wheel 600 includes a plurality of wheel sections 610. Each wheel section 610 includes a hub section 612 with a central bore (not shown). Each wheel section 610 includes a pair of spaced apart generally straight spokes 616 on each side of the perimeter section of the hub section 612 that project radially outward and connect to a generally curved rim 618. The distance between each pair of spokes 616 may increase from the hub section 612 to the rim 618. Accordingly, each pair of spokes 616 and the corresponding rim 618 defines a generally trapezoidal shape. The wheel 600 includes an axle 606 that is mounted through the central bores of the wheel sections 610. The axle 606 and the mechanisms and methods by which the axle 606 is operatively connected to the wheel and the cart are similar to the axle 106 and 406. Accordingly, a detailed description of the axle 606 is not provided.

Referring to FIGS. 21-25 a wheel 800 according to another example is shown. The wheel 800 includes a hub assembly 802 and a tire (not shown) that is mounted on the hub assembly 802 as described below. The wheel 800 also includes an axle 806 on which the hub assembly 802 and a tire are rotatably mounted. The hub assembly 802 includes a plurality of wheel sections 810 that are concentrically mounted on the axle 806. Each wheel section 810 includes a hub section 812 having a central bore 814 for receiving a section of the axle 806.

The tire may be mounted on a plurality of rims 818 that are positioned along a perimeter of a circle 817 that defines a central plane of the wheel 800. Each rim 818 is generally oriented perpendicular to the circle 817 (shown in FIG. 24) and is convex relative to the hub sections 812. Accordingly, each rim 818 is concave relative to the tire (not shown) so as to receive a curved section of the tire. Each rim 818 is attached to two spaced apart hub sections 812 by two spokes 816, respectively. The two hub sections 812 to which a rim 818 is attached with the spokes 816 are spaced apart so that the spokes 816 form a V-shaped support for each rim 818. For example, as shown in FIG. 22, the spokes 816 that support a rim 818 are connected to hub sections 812 are spaced apart by five hub sections 812. Thus, each hub section 812 has one spoke 816 on one side thereof that partially supports a first corresponding rim 818, and another spoke 816 on the opposite side thereof that partially supports a second corresponding rim 818.

Figure 23:
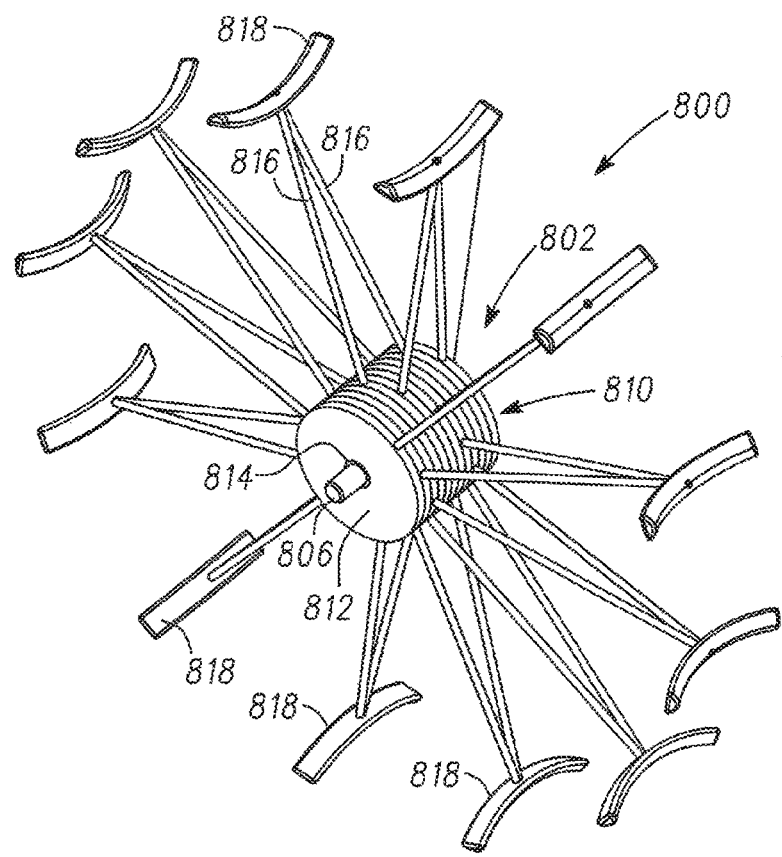
Figure 24:
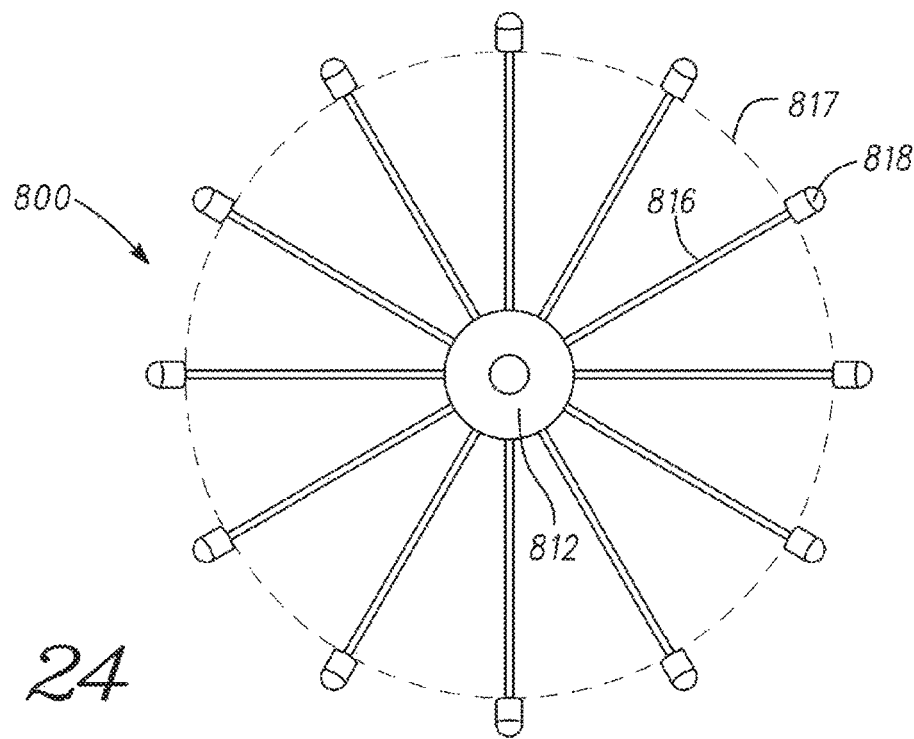

FIGS. 23-25 show the expanded position of the wheel 800. The spokes 816 are positioned on the hub sections 812 such that when the wheel 800 is in the expanded position, the spokes 816 are evenly distributed around the wheel, i.e., radially spaced apart on the circle 817 at a similar expansion angle. In the example of FIGS. 23-25, the spokes 816 are shown to be generally 30° apart in the expanded position of the wheel 800. FIGS. 21 and 22 show the collapsed position of the wheel 800. To collapse the wheel 800, the hub sections 812 may be rotated relative to each other until the rims 818 contact each other and prevent further rotation of the hub sections 812. To expand the wheel 800, the hub sections 812 may be rotated in an opposite direction relative to each other such that the wheel 800 reaches the expanded position shown in FIG. 23. Because each spoke 816 is located on a different hub section 812, the wheel 800 may require a rotation of less than 180° for expansion from the collapsed position to the expanded position. Accordingly, to expand the wheel 800 from the collapsed position as shown in FIG. 21, the spoke 820 is rotated clockwise until the spoke 820 is positioned close to spoke 822 and is prevented from further rotation by an expansion limiting mechanism as described below. Simultaneously, the spoke 824 is rotated clockwise until it is positioned close to spoke 826 and is prevented from further rotation by the expansion limiting mechanism. Thus, the largest rotation of a hub section 812 may be less than 180° to expand the wheel from the collapsed position to the expanded position.

To prevent further rotation of the hub sections 812 relative to each other when the wheel 800 reaches the expanded position shown in FIG. 23, the wheel 800 may include an expansion limiting mechanism as described above. Accordingly, each wheel section 810 may include a radial slot (not shown) on the hub section 812 and a pin (not shown) that may be located on the hub section 812 opposite to the slot relative to the central bore 814. The arc length of each radial slot 140 may be generally no greater than the expansion angle. In the example of FIG. 24 the arc length of the radial slot is about 30°, which is the same as the expansion angle.

A tire (not shown) may be mounted on the wheel 800 before or after the wheel is expanded. The tire may be constructed from a solid piece of rubber or other type of plastic material that has sufficient elasticity to allow mounting of the tire on the wheel 800. Alternatively, the tire may be in the form of an inflatable tube that may be mounted on the rims 818. Accordingly, the tire may be inflated by an individual before operating the wheel 810. Alternatively yet, the tire may be attached to one or more of the rims 818 such that the tire is maintained in a mounted configuration on the wheel 800 in both the collapsed and expanded positions of the wheel 800.

FIGS. 26-33 show several exemplary wheels and/or wheel sections according to the disclosure. A wheel section 1010 as shown in FIG. 26 may include at least one spoke 1016 on each side of a hub section 1012. The wheel section 1010 also includes a least one rim 1018 attached to each spoke 1016. Each spoke 1016 and the corresponding rim 1018 generally define a T-shaped spoke and rim assembly. A wheel section 1110 as shown in FIG. 27 may include at least one spoke 1116 on each side of a hub section 1112. The wheel section 1110 also includes at least one rim 1118 attached to each spoke 1116. Each spoke 1116 and the corresponding rim 1118 generally define an L-shaped spoke and rim assembly. According to the exemplary wheel sections 1010 and 1110, at least one rim and at least one spoke may be attached to each other in any configuration. For example, an end of a spoke may be attached to a center of the length of the rim as shown by the wheel section 1010 to provide a generally T-shaped spoke and the rim assembly. With the exemplary wheel section 1110 however, the end of the spoke is attached to one end of the rim. Therefore, a spoke and a rim may be attached to each other in any configuration and with any type of offset relative to each other.

Figure 29:
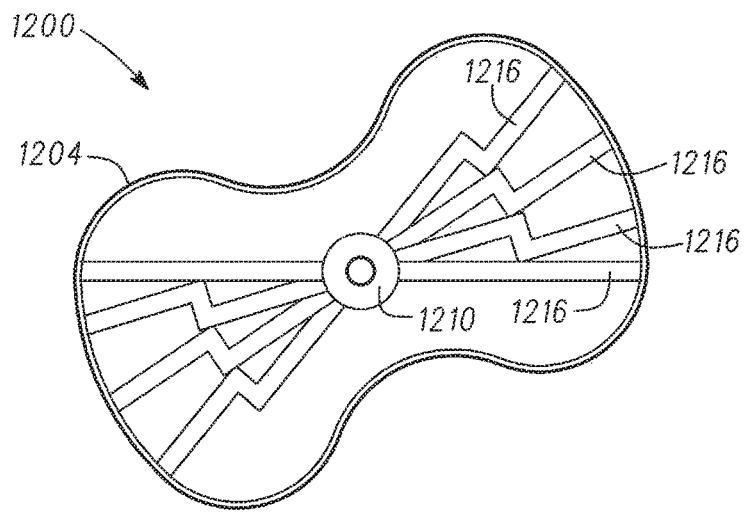

FIGS. 28 and 29 show a wheel 1200 according to another example. The wheel 1200 includes a plurality of wheel sections 1210, where each wheel section 1210 may have a different configuration as compared to one or more of the other wheel sections 1210. For example, each wheel section 1210 may have different shaped spokes 1216. The spokes 1216 may be straight, curved, L shaped, Z shaped and/or have any other shape that may be different from the spokes 1216 of one or more of the other wheel sections 1210. Depending on the shape of each spoke 1216, each spoke may have different thickness, may be constructed from a different material and/or have a certain property that may be different from or similar to one or more other spokes 1216 of one or more other wheel sections 1210. A tire 1204 may be mounted on the wheel 1200 in both the collapsed position and in the expanded position of the wheel 1200.

Figure 30:
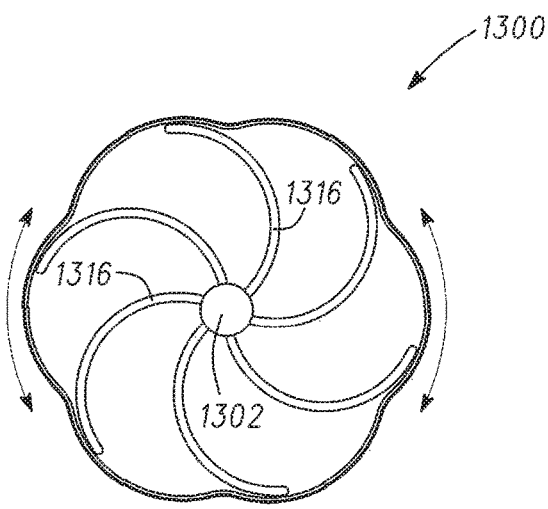
FIGS. 30 and 31 show side views of a wheel according to one embodiment.
Figure 31:
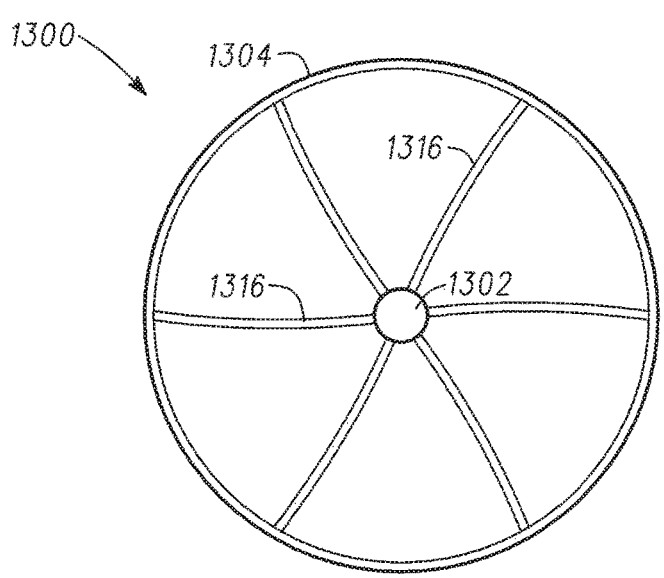

FIGS. 30 and 31 show a wheel 1300 according to another example. The wheel 1300 includes a plurality of spokes 1316. Each spoke may be flexible so as to deform from an extended position corresponding to the expanded position of the wheel 1300 to a deformed position corresponding to the collapsed position of the wheel 1300. FIG. 30 shows an example of the wheel 1300 in the process of being expanded between the collapsed position and the expanded position shown in FIG. 31. In the extended position of the spokes 1316 as shown in FIG. 31, the spokes 1316 have sufficient collective rigidity to support the loads on the tire 1304 and the hub assembly 1302 to provide operation of the wheel 1300 as disclosed. However, the spokes 1316 are flexible so that the wheel 1300 may be collapsed by deforming the spokes 1316 to collapse the wheel 1300. As shown in the example of FIG. 30, the spokes 1316 may be deformed by being bent and stacked on top of each other around the hub 1312. The spokes 1316 may also provide a shock absorbing function for the wheel 1300. The wheel 1300 may include a singular hub 1312 to which all of the flexible spokes 1316 are attached. Alternatively, the wheel 1300 may include a plurality of hub sections, where each hub section is rotatable relative to an adjacent hub section to facilitate collapsing and expanding of the wheel 1300 to which one or more spokes 1316 may be attached. As shown in FIGS. 30 and 31, the wheel 1300 may also include a tire 1304, which may be similar to the exemplary tires disclosed herein.

Figure 32:
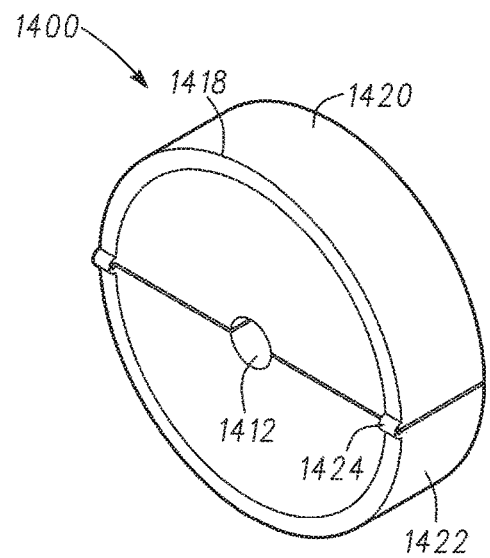
FIGS. 32 and 33 show perspective views of a wheel according to one embodiment.
Figure 33:
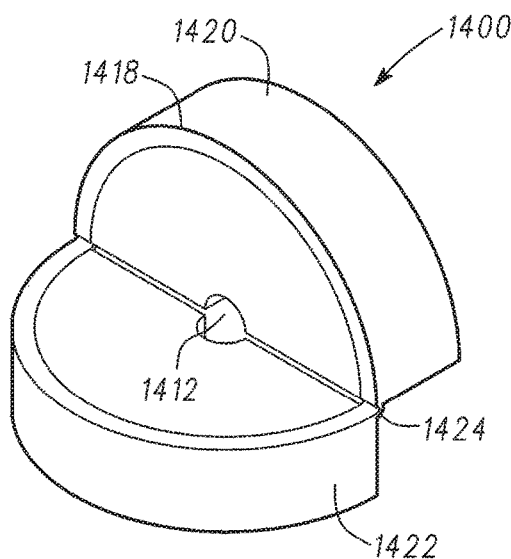

FIGS. 32 and 33 show a wheel 1400 according to another example. The wheel 1400 includes a hub 1412 to which the rim 1418 is attached. The rim 1418 includes a first rim section 1420 and a second rim section 1422 that are pivotally mounted to the hub 1412 by one or more hinges 1424. As shown in FIG. 33, the first rim section 1420 and the second rim section 1422 can be pivoted at the hinge 1424 to collapse the wheel 1400 from the expanded position shown in FIG. 32 to a collapsed position (not shown). Thus, the size of the wheel 1400 may be reduced for storage and/or transportation upon collapsing the wheel from the expanded position.

Figure 34:
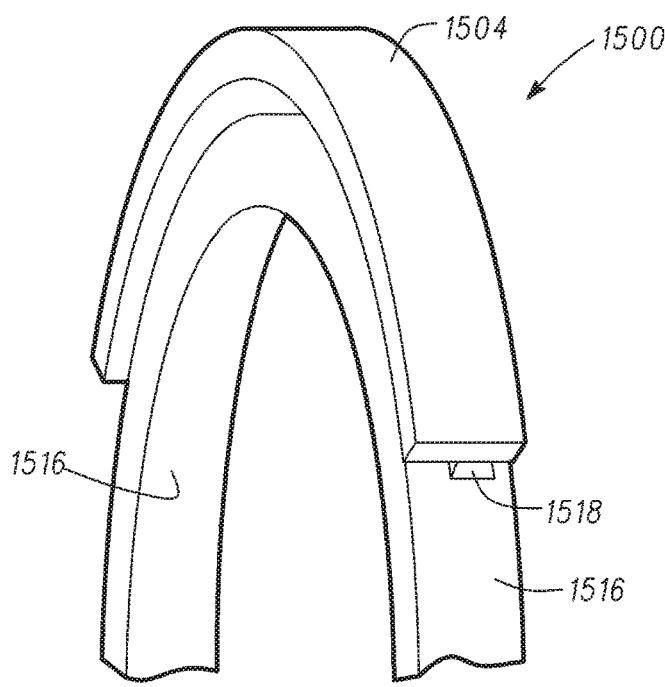
FIG. 34 shows a partial perspective view of the wheel section of a wheel according to one embodiment having a tire section.

Referring to FIG. 34, a section of a wheel 1500 according to another example is shown. The wheel 1500 includes at least one spoke 1516 and at least one rim 1518 that is attached to the spoke 1516. The wheel 1500 may not include a one-piece tire similar to the examples described above. Instead, a tire section 1504 is attached to each rim 1518. Accordingly, when the wheel 1500 is expanded to an expanded position, the tire sections 1504 collectively define a tire for the wheel 1500. Therefore, the tire for the wheel 1500 is defined by a plurality of tire sections 1504 and any gaps that may be present between adjacent tire sections 1504. As with the examples described above, the tire section 1504 may be constructed from an elastic material such as rubber. The tire sections 1504 may then be attached to a rim 1518 with an adhesive, one or more fasteners and/or one or more other types of attachment devices or procedures.

Referring to FIGS. 35-41, a wheel 1600 according to another example is shown. The wheel 1600 includes a hub assembly 1602. The wheel 1600 may include a tire (not shown) that may be mounted on the hub assembly 1602. Alternatively, the wheel 1600 may include a plurality of tire sections as described above with respect to the wheel 1500. Alternatively yet, the wheel 1600 may operate without a tire. The wheel 1600 also includes an axle 1606 on which the hub assembly 1602 is rotatably mounted. The hub assembly 1602 includes a plurality of wheel sections 1610 that are concentrically mounted on the axle 1606. Each wheel section 1610 includes a hub section 1612 having a central bore 1614 for receiving a section of the axle 1606.

Figure 35:
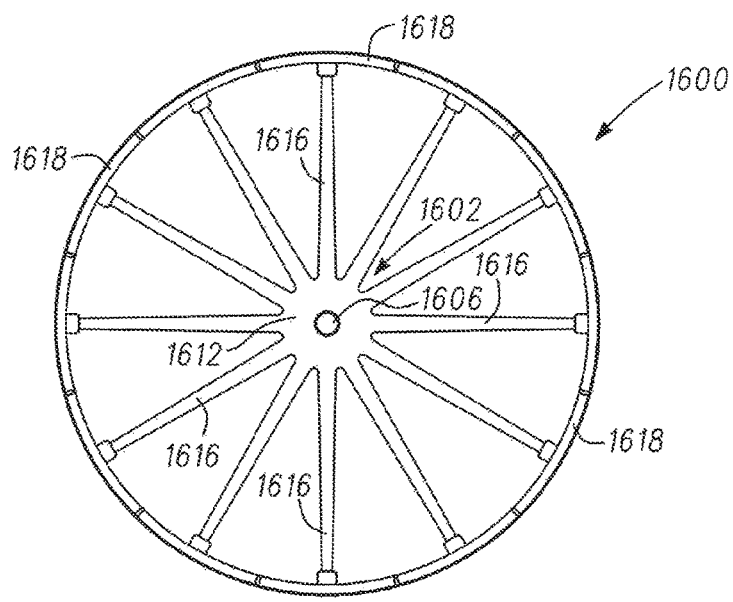

The wheel 1600 includes a plurality of rims 1618 that are configured to define a path on a circumferential or circular band 1617 having a width 1619. The path defined by the rims 1618 may be substantially continuous. The circular band 1617 defines a circular contact area similar to a tire (shown in FIG. 38) between the wheel 1600 and the ground. In the expanded position of the wheel 1600, each rim 1618 may be oriented such that at least one point on at least one rim 1618 contacts the ground. In one example, each rim 1618 is positioned diagonally on the circular band 1617. Each rim 1618 may be radially spaced apart from an adjacent rim 1618 as long as the space does not provide a large enough gap to substantially disturb or hinder generally smooth rolling of the wheel 1600 on the ground. Alternatively, each rim 1618 may not have a radial gap relative to an adjacent rim 1618. Alternatively yet, each rim 1618 may have a radial overlap with an adjacent rim 1618. In the example of FIG. 38, each rim 1618 has a small gap relative to an adjacent rim 1618. Each rim 1618 may also be curved so that points on adjacent rims 1618 that are spaced apart at a certain angle are located on the circular band 1617. Thus, as shown in FIG. 35, the rim 1618 defines a portion of a path on a generally continuous circle in the expanded position of the wheel 1600. In other words, the curvature of each rim 1618 may generally follow the curvature for the circle defining a plane of the wheel 1600.

Figure 41:
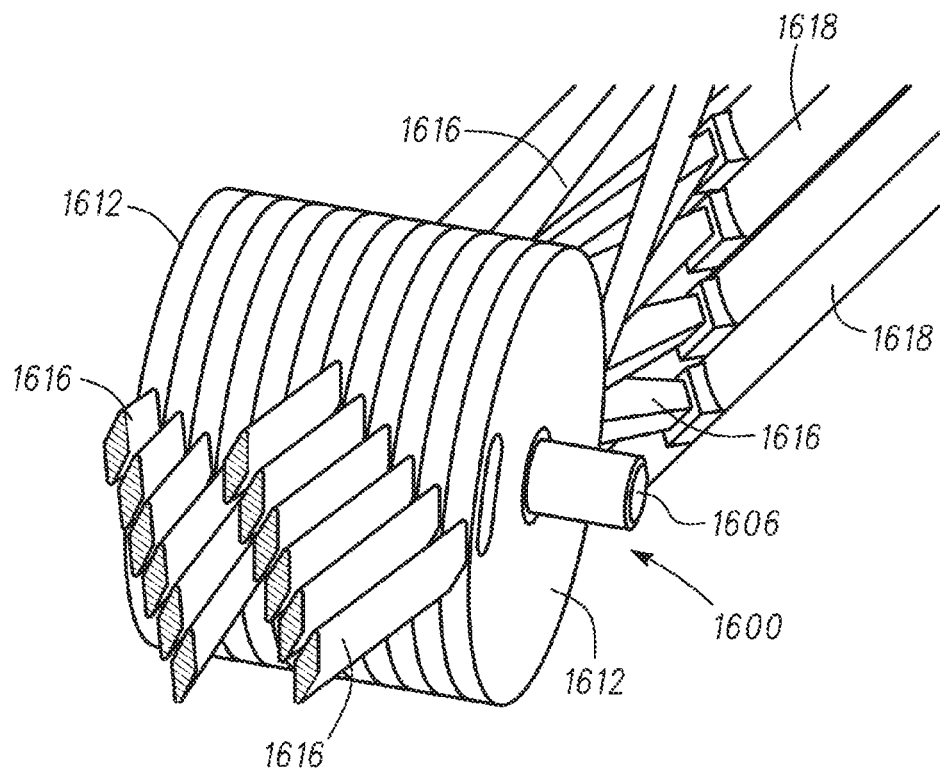
FIG. 41 shows perspective cross-sectional views of spokes of the wheel of FIG. 35.

Each rim 1618 is attached to two spaced apart hub sections 1612 by two spokes 1616, respectively. The two hub sections 1612 to which a rim 1618 is attached with the spokes 1616 are spaced apart so that the spokes 1616 form a V-shaped support for each rim 1618. For example, as shown in FIG. 41, the spokes 1616 that support a rim 1618 are spaced apart by four hub sections 1612. Thus, each hub section 1612 has one spoke 1616 on one side thereof that partially supports a first corresponding rim 1618, and another spoke 1616 on the opposite side thereof that partially supports a second corresponding rim 1618.

Figure 36:
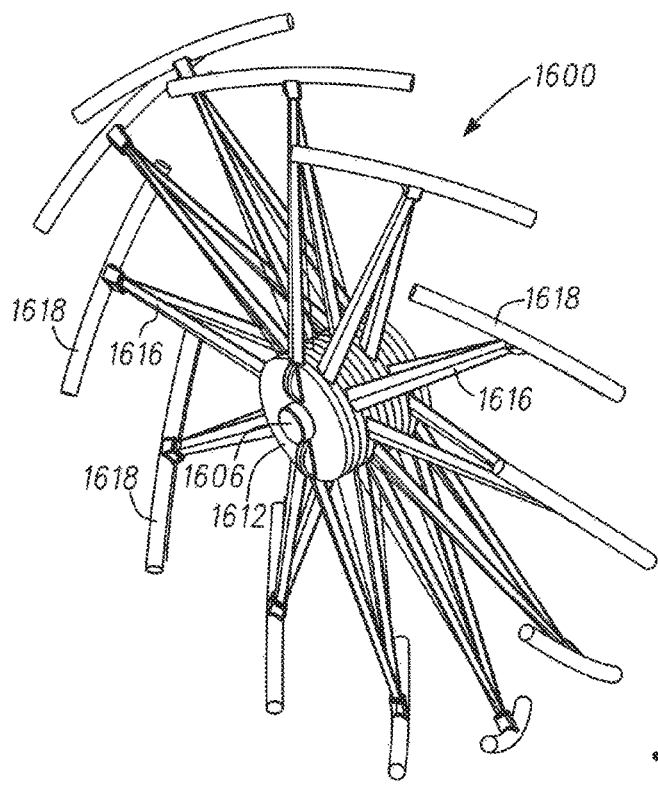
Figure 37:
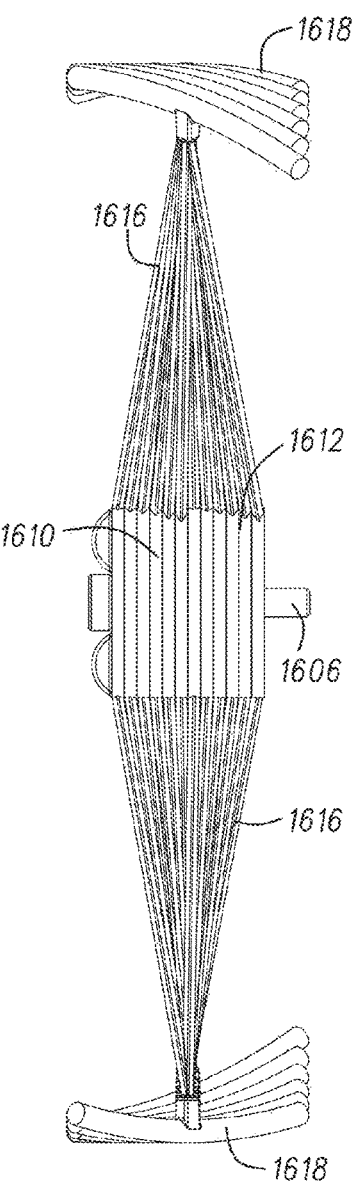

FIGS. 35, 36 and 38 show the expanded position of the wheel 1600. The spokes 1616 are positioned on the hub sections 1612 such that when the wheel 1600 is in the expanded position, the spokes 1616 are evenly distributed around the wheel, i.e., radially equally spaced apart at a similar expansion angle. In the example of FIG. 35, the spokes 1616 are shown to be generally 30° apart in the expanded position of the wheel 1600. FIGS. 37, 39 and 40 show the collapsed position of the wheel 1600. To collapse the wheel 1600, the hub sections 1612 may be rotated relative to each other until the rims 1618 contact each other and prevent further rotation of the hub sections 1612. Each spoke 1616 may have a certain cross-sectional shape to provide a more compact collapsed position for the wheel 1600. For example, each spoke 1616 may have a diamond shaped cross-section as shown in FIG. 41. Accordingly, when the wheel 1600 is collapsed, each spoke 1616 may be positioned relative to an adjacent spoke 1616 in the complementary or a formfitting manner. Therefore, the spokes 1616 may collectively occupy less space as compared to a scenario where each spoke 1616 has a certain shape that does not lend itself to such complementary fitting with an adjacent spoke 1616.

To expand the wheel 1600, the hub sections 1612 may be rotated in an opposite direction relative to each other such that the wheel 1600 reaches the expanded position 1612. Because each spoke 1616 is located on a different hub section 1612, the wheel 1600 may require a rotation of less than 180° for expansion from the collapsed position to the expanded position as described in detail with respect to the wheel 800, hence not repeated herein. Thus, the largest rotation of a hub section 1612 may be less than 180° to expand the wheel 1600 from the collapsed position to the expanded position.

To prevent further rotation of the hub sections 1612 relative to each other when the wheel 1600 reaches the expanded position, the wheel 1600 may include an expansion limiting mechanism as described above. Accordingly, each wheel section 1610 may include a radial slot (not shown) on the hub section 1612 and a pin (not shown) that may be located on the hub section 1612 opposite to the slot relative to the central bore 1614. The arc length of each radial slot may be generally no greater than the expansion angle.

Similar to the example of FIG. 34, each rim 1618 may include a tire section (not shown) that is attached to each rim 1618. For example, each tire section (not shown) may be a generally rectangular strip of rubber or like elastic materials that is attached to each rim 1618 along the length of the rim 1618. Thus, each tire section generally follows the orientation and the spatial position of each rim 1618 on the circular band 1617 as described above. Accordingly, when the wheel 1600 is expanded to an expanded position, the tire sections collectively define a tire for the wheel 1600. As with the examples described above, a tire section may be constructed from an elastic material such as rubber. The tire sections may then be attached to a rim 1618 with an adhesive, one or more fasteners and/or one or more other types of attachment devices or procedures.

A tire (not shown) may be mounted on the wheel 1600 before after the wheel is expanded. The tire may be constructed from a solid piece of rubber or other type of plastic material that has sufficient elasticity to allow mounting of the tire on the wheel 1600. Alternatively, the tire may be in the form of an inflatable tube that may be mounted on the rims 1618. Alternatively yet, the tire may be attached to one or more of the rims 1618 such that the tire is maintained in a mounted configuration on the wheel 1600 in both the collapsed and expanded positions of the wheel 1600.

FIGS. 45-56 illustrate another example of an embodiment of a wheel 1900. The wheel 1900 has similar structure and/or components of the wheel 100, and the other embodiments of the wheel described herein. Accordingly, similar terms are used to describe similar components. Referring to FIGS. 45-46, the wheel 1900 includes a hub assembly 1902 that is connected to a tire or track assembly 1904. The track assembly 1904 is a tracked portion or an infinite track that is defined by a plurality of interconnecting or interlocking track segments 1905. The track assembly 1904 is connected to an axle 1906 of the hub assembly 1902 by a plurality of wheel sections 1910. The plurality of wheel sections 1910 are aligned and mounted to the axle 1906. It should also be appreciated that the wheel 1900 can be formed of one or more of the wheel sections 110, 610, 810, etc., or aspects or components thereof, as described herein.

Figure 47:
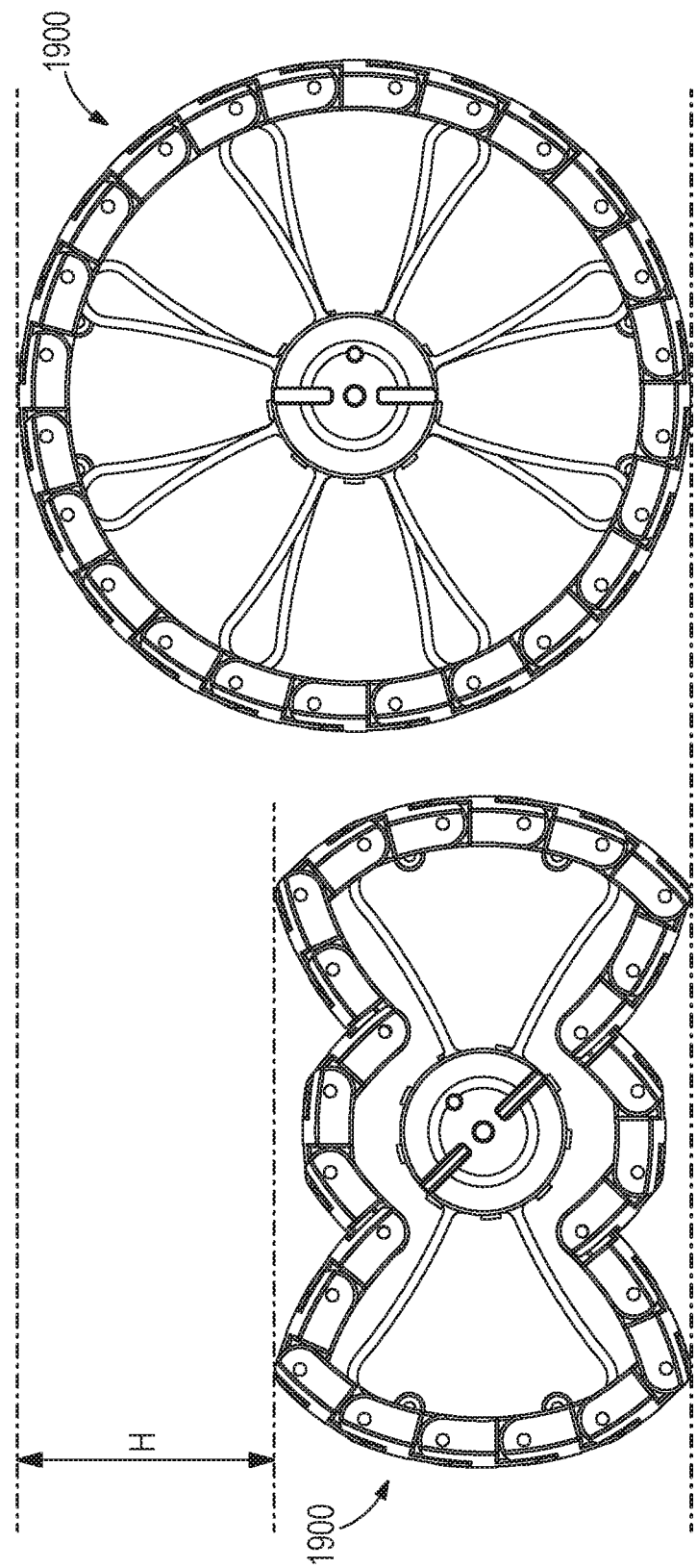
FIG. 47 shows a side view of the wheels of FIGS. 45 and 46, comparing the collapsed position to the expanded position.

Similar to the other embodiments of a wheel disclosed herein, the wheel sections 1910 rotate about the axle 1906 to adjust the wheel 1900 between an expanded position (or expanded configuration) (see FIG. 45) and a collapsed position (or collapsed configuration) (see FIG. 46). As illustrated in FIG. 47, collapsing the wheel 1900 from the expanded position to the collapsed position realizes a decrease in height H of the wheel 1900. The reduction in height H can be approximately 35% of the height of the wheel 1900 in the expanded position. However, in other embodiments the reduction in height H can be any suitable or targeted range of height reduction, including a 10% height reduction up to and/or exceeding a 50% height reduction. By reducing the wheel height in the collapsed position, the footprint of the wheel 1900 is reduced, which reduces the overall space or volume necessary to store the wheel 1900 (e.g., stored in a vehicle trunk, garage, basement, luggage, or any other suitable or desired location).

Figure 48:
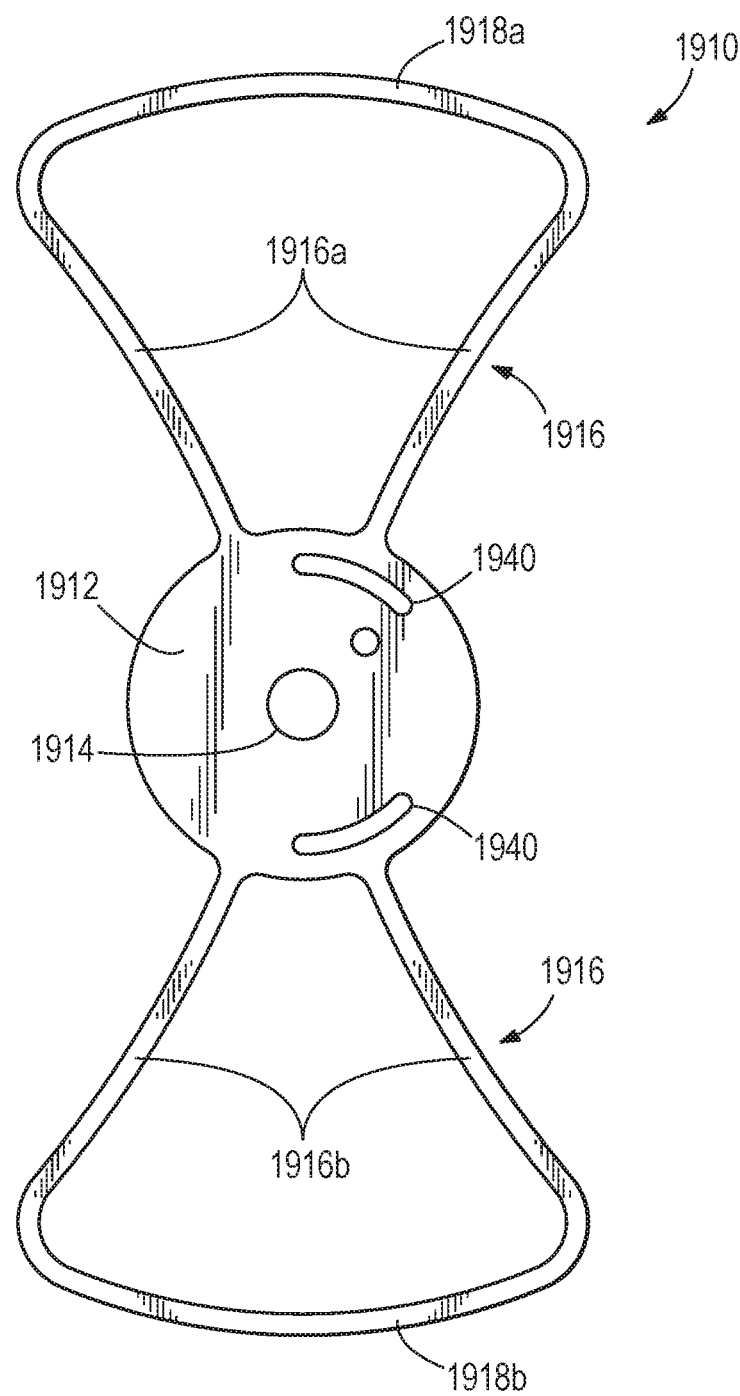
FIG. 48 shows a side view of a wheel section of the wheel of FIG. 45.

FIG. 48 illustrates an example of one of the wheel sections 1910. The wheel section 1910 includes a hub section 1912 that defines a central bore 1914 configured to receive a portion of the axle 1906. The wheel section 1910 includes a plurality of spokes 1916 that project from the hub section 1912 to a rim 1918. In the embodiment illustrated in FIG. 48, a first pair of spokes 1916*a* radially extend from the hub section 1912 to define a first rim 1918*a*, while a second pair of spokes 1916*b* radially extend from the hub section 1912 to define a second rim 1918*b*. The first spokes 1916*a* are positioned opposite the second spokes 1916*b*. In other embodiments, each wheel section 1910 can have any suitable or desired number of spokes 1916 and/or rims 1918. The hub section 1912 can also include one or more radial slots 1940, which correspond to and function in the same manner as radial slots 140 (i.e., to limit the rotation distance of each wheel section 1910 about the axle 1906).

Figure 49:
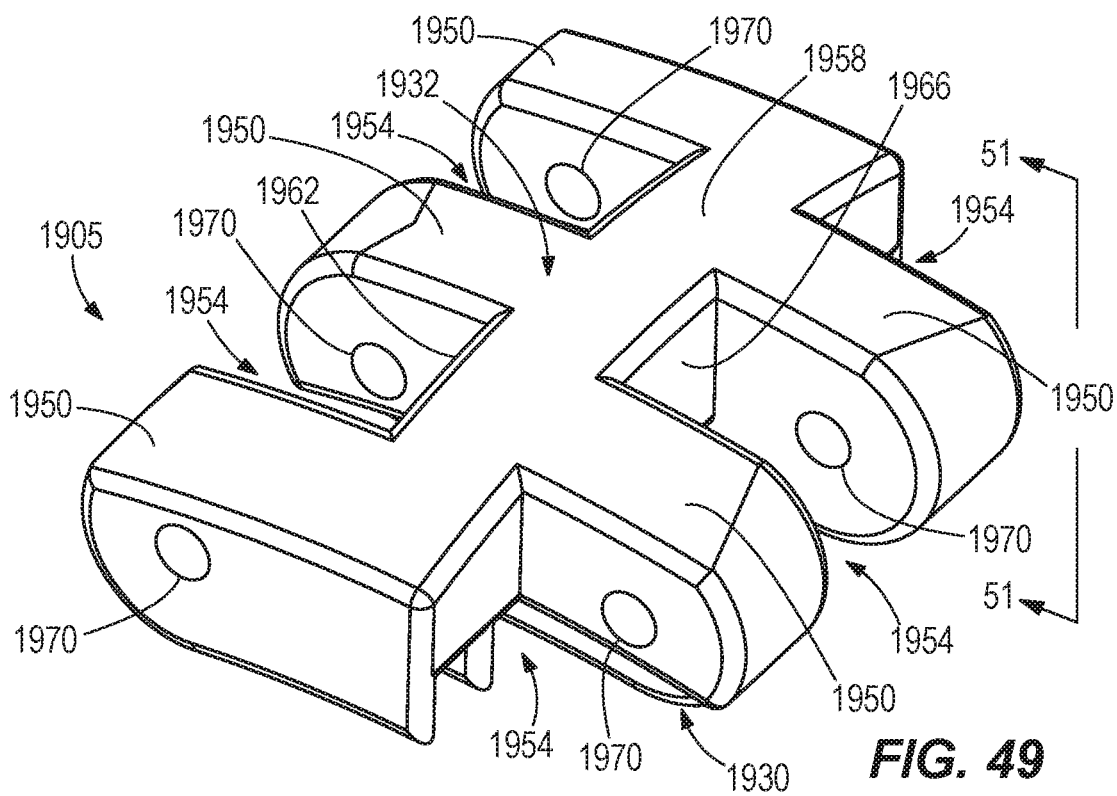
FIG. 49 shows a perspective view of a track segment of the wheel of FIG. 45, illustrating an outer surface.
Figure 50:
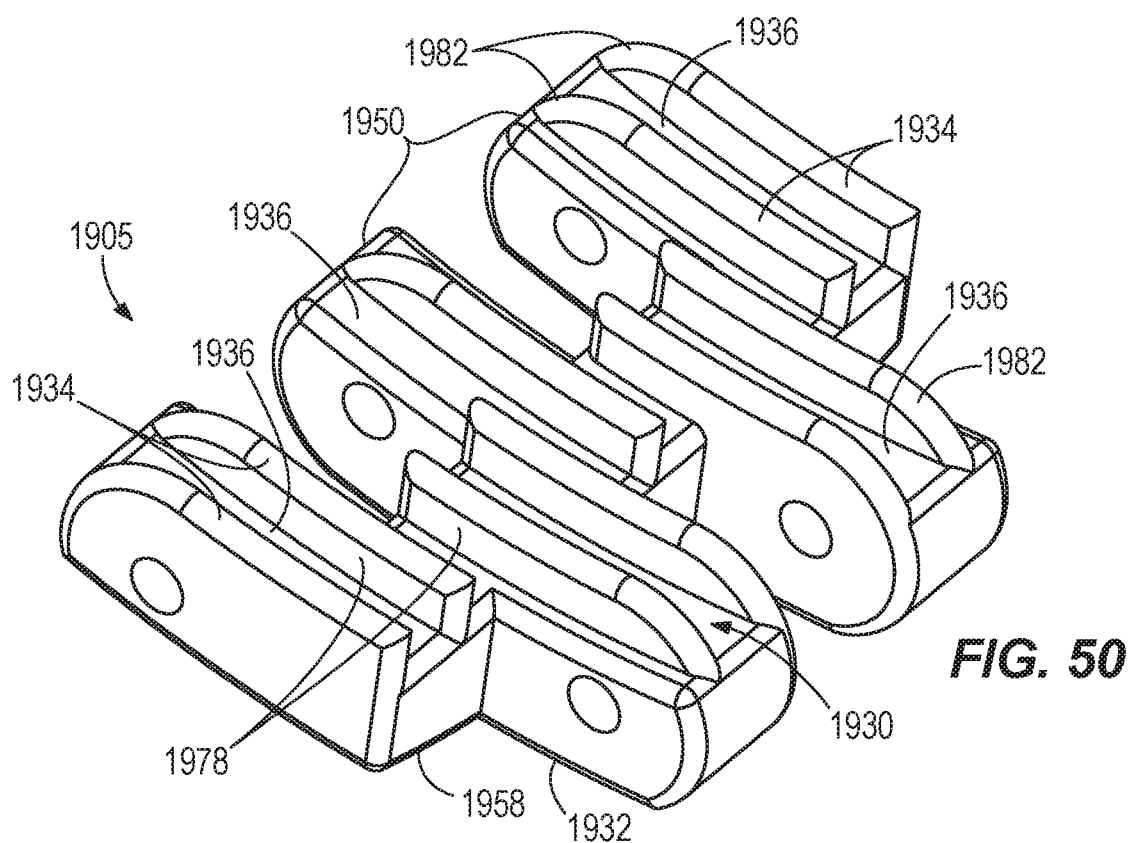
FIG. 50 shows a perspective view of the track segment of FIG. 49, illustrating an inner surface.

FIGS. 49-52 illustrate an example of an embodiment of the track segment 1905 used with the wheel 1900. With reference to FIGS. 49-51, each track segment 1905 has a generally arcuate cross-sectional shape in order to form the wheel 1900 when the plurality of track segments 1905 are interconnected. The track segment 1905 includes an inner surface 1930 opposite an outer surface 1932. The inner surface 1930 is configured to engage the wheel sections 1910, while the outer surface 1932 is configured to engage the ground, terrain, or other surface traversed by the wheel 1900. Accordingly, the outer surface 1932 has a generally arcuate shape. In the illustrated embodiment, the features of the inner surface 1930 also has a generally arcuate shape. However, the cross-section shape of the inner surface 1930 can be any suitable shape to receive and allow for rotation of the wheel sections 1910 in accordance with the disclosure provided herein.

The inner surface 1930 includes a plurality of ribs 1934. The ribs 1934 are generally parallel to one another, and radially project away from the inner surface 1930 to define a plurality of circumferential grooves 1936. Each of the grooves 1936 is configured to receive the rim 1918 of one or more corresponding wheel sections 1910. Accordingly, the number of grooves 1936 (and thus the number of ribs 1934 that define the grooves 1936) depends on the number of wheel sections 1910 used in the wheel 1900. Any suitable number of grooves 1936 can be defined by each track segment 1905.

Each track segment 1905 includes a plurality of circumferential projections 1950 that define slots 1954. The projections 1950 and slots 1954 extend circumferentially along the track segment 1905 to facilitate a connection with adjacent track segments 1905. With specific reference to FIG. 49, the track segment 1905 includes a central member 1958 from which the plurality of projections 1950 extend. The central member 1958 includes a first side 1962 opposite a second side 1966. An odd number of projections 1950 extend away from the first side 1962, while an even number of projections 1950 extend away from the second side 1966. In the illustrated embodiment, three projections 1950 extend away from the first side 1962 in a circumferential direction, and two projections 1950 extend away from the second side 1966 in a circumferential direction. Adjacent projections 1950 on each side 1962, 1966 are spaced to define the slots 1954. Each slot 1954 is sized and configured to receive a projection 1950 from an adjacent track segment 1905. Similarly, each projection 1950 is sized to be received by a slot 1954 of an adjacent track segment 1905. To facilitate the connection of adjacent track segments 1905, each projection 1950 can include an aperture 1970 that extends through the projection 1950. The apertures 1970 are aligned along each side 1962, 1966 of the central member 1958 and are configured to receive a dowel, shaft, or other suitable member 1974 (see FIG. 53) to secure or interconnect adjacent track segments 1905.

It should be appreciated that when the track segments 1905 are interconnected to define the track assembly 1904, each groove 1936 of the track segment 1905 cooperates with the associated circumferentially aligned groove 1936 of adjacent track segments 1905 to form a circumferential groove 1936 around the circumference of the wheel 1900. Similarly, each rib 1934 of the track segment 1905 cooperates with the associated circumferentially aligned rib 1934 of adjacent track segments 1905 to form a circumferential rib 1934 around the circumference of the wheel 1900. The circumferential ribs 1934 maintain each wheel section 1910, and more specifically the rims 1918 of each wheel section 1910, in the appropriate or associated circumferential groove 1936. In addition, the circumferential ribs 1934 retain the one or more of the wheel sections 1910, and more specifically the rims 1918 of those wheel sections 1910, within the appropriate or associated circumferential groove 1936. Accordingly, as the wheel sections 1910 rotate about the axle 1906 and slide within (i.e., move relative to) the respective circumferential groove 1936, the circumferential ribs 1934 assist with keeping the wheel section 1910 in the respective circumferential groove 1936. In the illustrated embodiment, the rims 1918 have a generally square or rectangular cross-sectional shape, as viewed along a cross-section that is taken in an axial direction parallel to the axle 1906. The grooves 1936 have a complimentary cross-sectional shape in order to receive the rims 1918, while also allowing the rims 1918 to slide within the respective groove 1936 (as the wheel section 1910 rotates about the axle 1906). In other embodiments, the rims 1918 and the grooves 1936 may have any complimentary cross-sectional shape. Generally, the grooves 1936 have a shape and/or size that corresponds to the shape and/or size of the rims 1918. The grooves 1936 can be approximately 0.10 inches to approximately 0.30 inches wide, and more preferably approximately 0.20 inches wide. Each rim 1918 and/or groove 1936 can also be sized to provide adequate clearance between the rim 1918 and the ribs 1934 that define a portion of the groove 1936 when the rim 1918 is received by the groove 1936. For example, the rim 1918 or groove 1936 can have a width to provide approximately 0.010 inches to approximately 0.030 inches of clearance between the rim 1918 and ribs 1934, and more preferably approximately 0.014 inches of clearance between the rim 1918 and ribs 1934.

While FIG. 49 illustrates three projections 1950 on the first side 1962, and two projections 1950 on the second side 1966 of the central member 1958, in other embodiments any number of projections may be used. However, in these other embodiments, an odd number of projections are provided on one side of the central member 1958, and an even number of projections are provided on the opposite, other side of the central member 1958. For example, one side of the central member 1958 can have 1, 3, 5, 7, 9, 11, 13, 15, 17, 19, etc. projections 1950, while the other side of the central member 1958 can have 2, 4, 6, 8, 10, 12, 14, 16, 18, 20, etc. projections 1950. Generally, one side of the central member 1958 will have N number of projections 1950, while the other, opposing side of the central member 1958 will have N−1 (or N+1) projections 1950. While the track segment 1905 is defined above in terms of projections 1950, the track segment 1905 can be similarly defined in terms of slots 1954. The track segment 1905 can have an even number of slots 1954 on the first side 1962 of the central member 1958, and an odd number of slots 1954 on the second side 1966 of the central member 1958. Generally, one side of the central member 1958 will have N number of slots 1954, while the other, opposing side of the central member 1958 will have N−1 (or N+1) slots 1954.

Referring back to FIG. 50, each track segment 1905 can have any number of ribs 1934 and any number of grooves 1936. In the illustrated embodiment, each track segment 1905 includes nine ribs 1934 and eight grooves 1936. In other embodiments, each track segment 1905 can include any number of ribs 1934, such as 1, 2, 3, 4, 5, 6, 7, 8, 9, 10, 11, 12, 13, 14, 15, 16, 17, 18, 19, 20, or more. Further, in other embodiments, each track segment 1905 can include any number of grooves 1936, such as 1, 2, 3, 4, 5, 6, 7, 8, 9, 10, 11, 12, 13, 14, 15, 16, 17, 18, 19, 20, or more. The number of grooves 1936 generally corresponds to the number of wheel sections 1910 (since each groove 1936 receives at least one wheel section 1910). In addition, each track segment 1905 can have any suitable distribution of ribs 1934 and grooves 1936 on the projections 1950. For example, in the illustrated embodiment, a plurality of projections 1950 have two ribs 1934 that define at least one groove 1936 and a portion of a second groove 1936, while one projection 1950 (the center projection 1950 that projects on the first side 1962 of the central member 1958) has one rib 1934 that defines a portion of two grooves 1936. However, in other embodiments, the projections 1950 can have any suitable or desired number of ribs and/or channels (or portions thereof). Further, the projections 1950 can have different numbers of ribs 1934 and/or channels 1936 (e.g., one projection 1950 can have two ribs 1934, while another projection 1950 can have five ribs). Accordingly, any suitable or desired number of ribs 1934 and/or grooves 1936 can be positioned on each projection 1950.

Each rib 1934 has a rib height 1978. In the illustrated embodiment, the rib height 1978 is approximately constant as the rib 1934 extends from the central member 1958. However, as the rib 1934 reaches an end of the projection 1950 opposite the central member 1958, the rib height 1978 decreases or has a curved end portion 1982. The curved portions 1982 assist with avoiding contact with ribs 1934 of adjacent track segments 1905 when all track segments 1905 are interconnected to form the wheel 1900.

Figure 53:
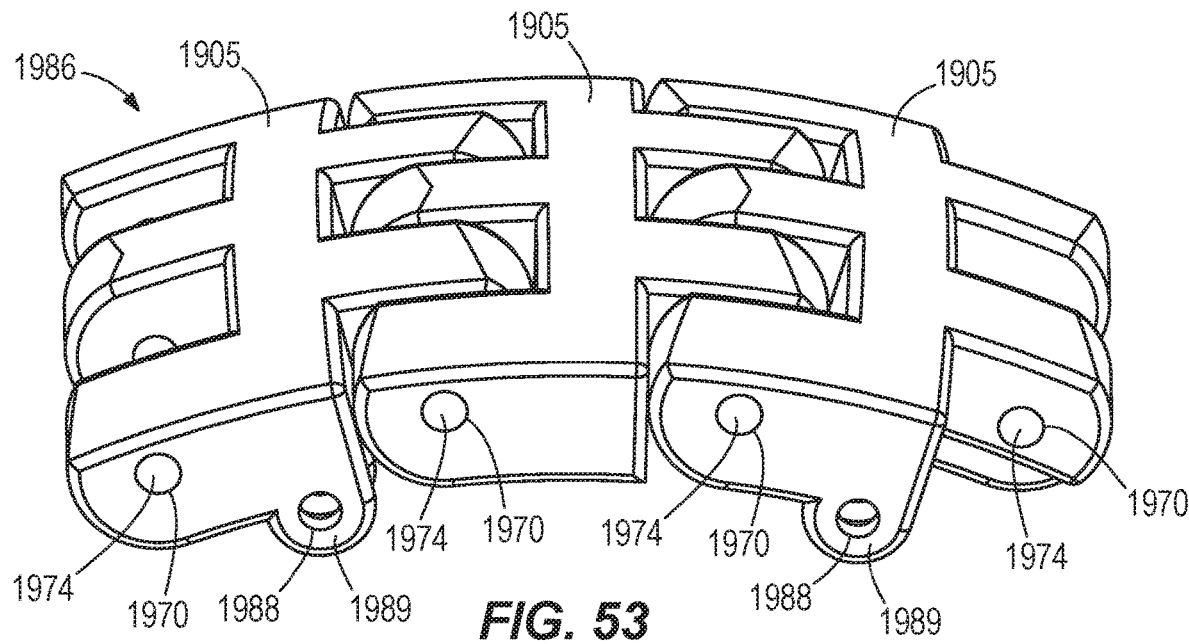
FIG. 53 shows a perspective view of a portion of the track assembly of FIG. 45 illustrating the outer surface.
Figure 54:
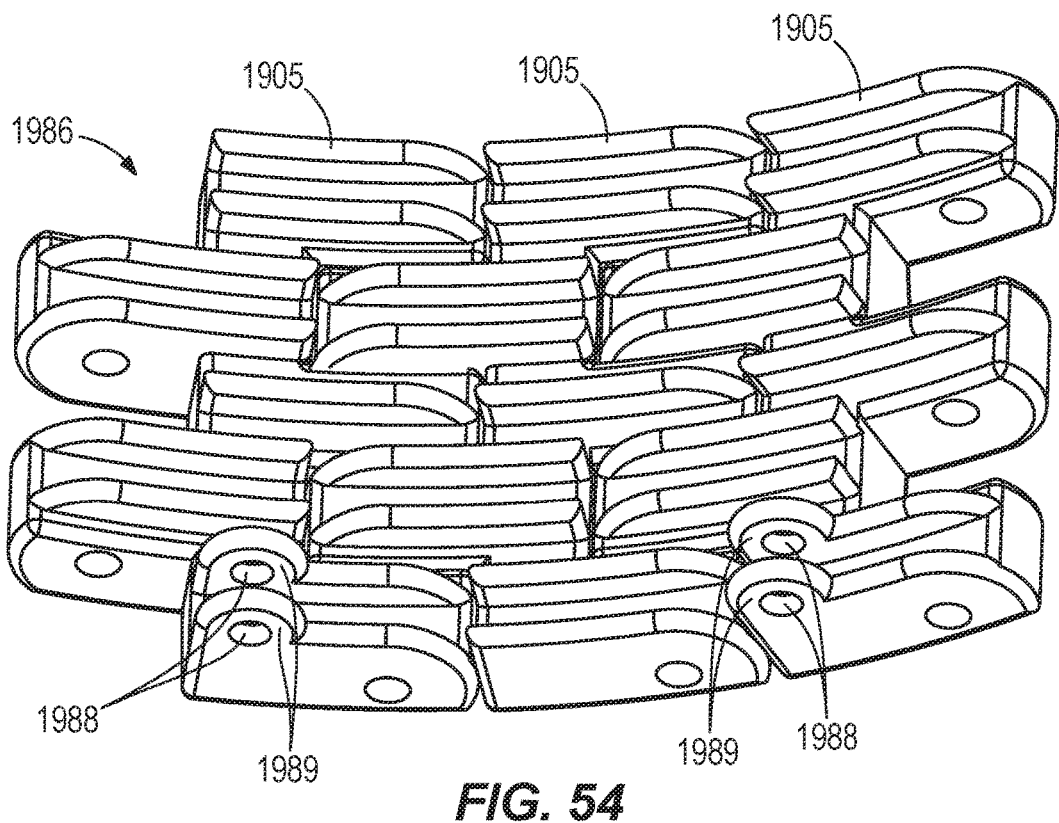
FIG. 54 shows a perspective view of a portion of the track assembly of FIG. 53, illustrating the inner surface.
Figure 55:
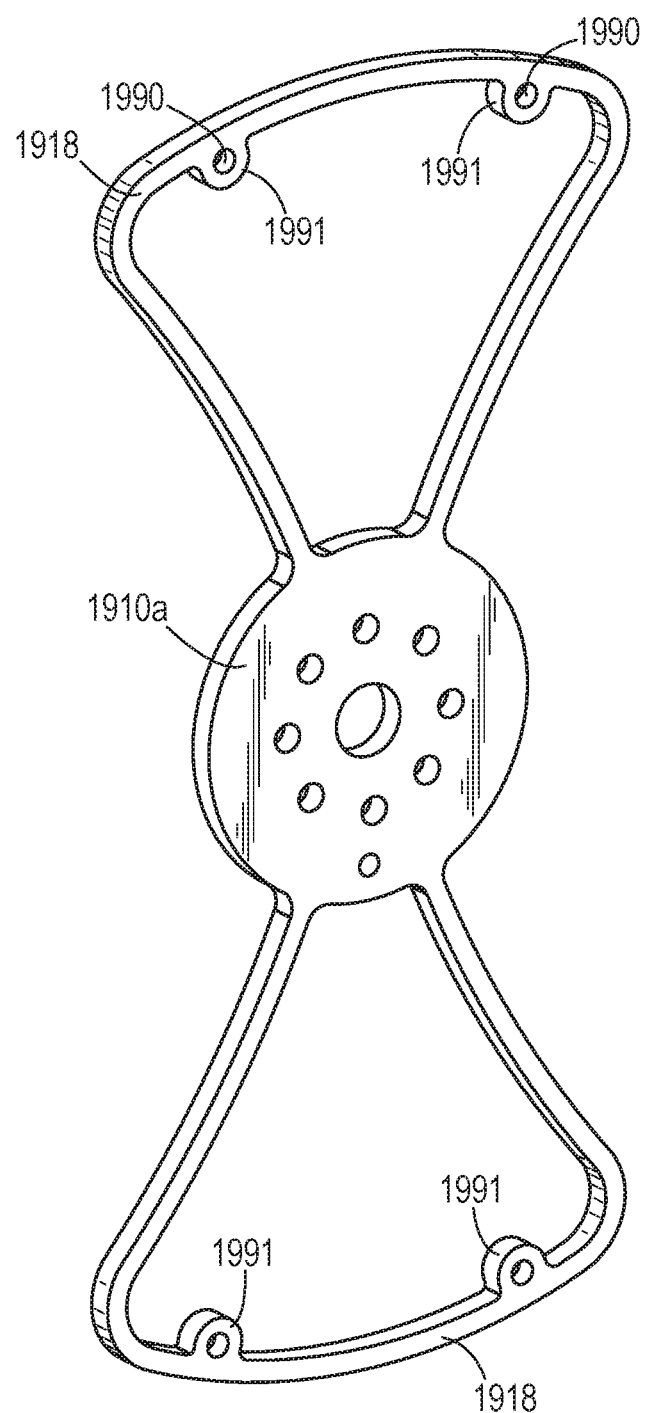
FIG. 55 shows a perspective view of a wheel section of the wheel of FIG. 45 configured to be secured to the portion of the track assembly of FIG. 53.

Referring to FIGS. 53-54, the plurality of track segments 1905 are connected together to form the track assembly 1904, only a portion of which is shown. As previously disclosed, the track segments 1905 are connected by securement members 1974 received by apertures 1970 in the projections 1950. While any suitable securement member 1974 can be used, preferably the track segments 1905 can rotate about the securement members 1974 to facilitate collapsing of the wheel 1900.

FIGS. 53-54 illustrate a portion 1986 of the track assembly 1904 formed by three track segments 1905. Any suitable number of track segments 1905 can be interconnected to form the track assembly 1904. For example, as illustrated in FIGS. 45-46, twenty-four (24) track segments 1905 define the track assembly 1904 that forms the wheel 1900. Stated otherwise, each track segment 1905 extends along approximately fifteen degrees (15°) of the wheel 1900 (i.e., 360 degrees divided by twenty-four (24) track segments). In other embodiments, each track segment 1905 can extend along any suitable number of degrees of the wheel 1900. Stated otherwise, any number of track segments 1905 can be interconnected to form the wheel 1900.

Figure 58:
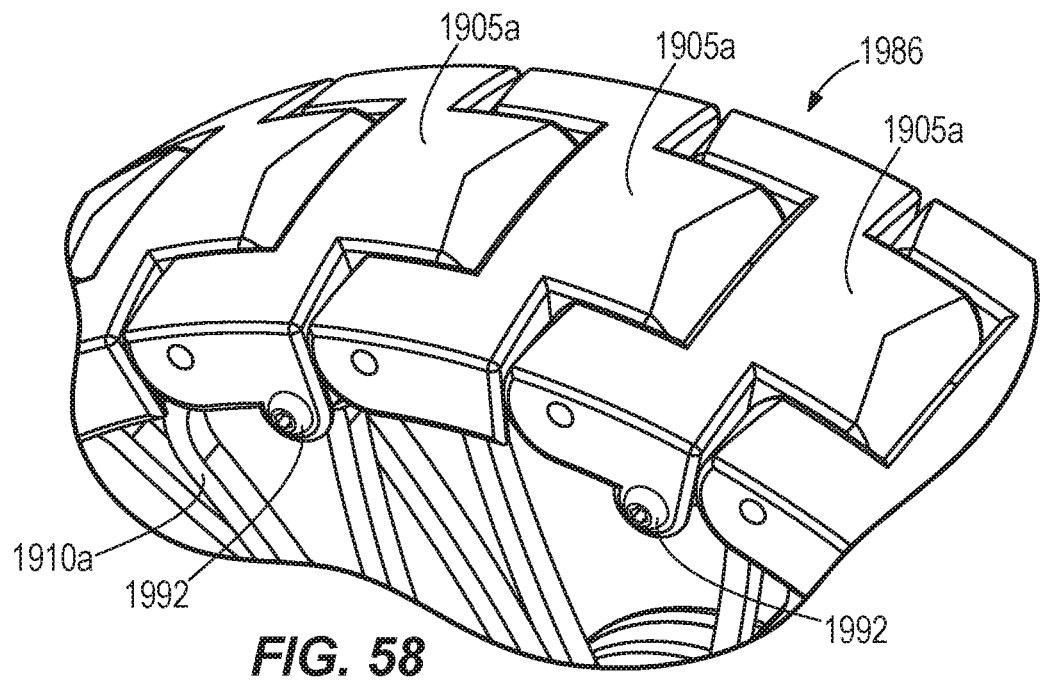
FIG. 58 shows a perspective view of a portion of the track assembly of the wheel of FIG. 57, taken along line 58-58 of FIG. 57.
Figure 59:
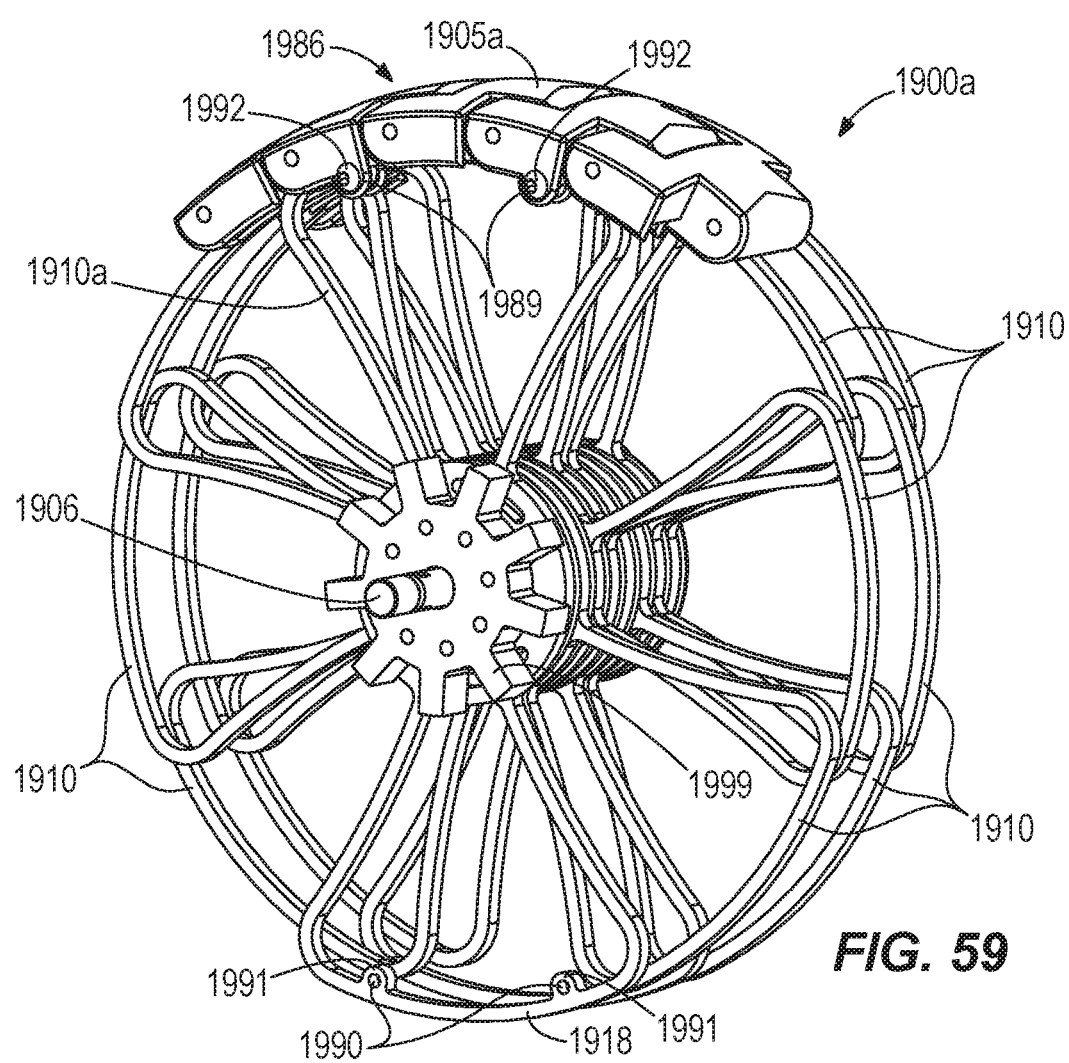
FIG. 59 shows a perspective view of the wheel of FIG. 57 with a portion of the track assembly removed to further illustrate the wheel sections in the expanded position, and a portion of the track assembly secured to a wheel section.
Figure 61:
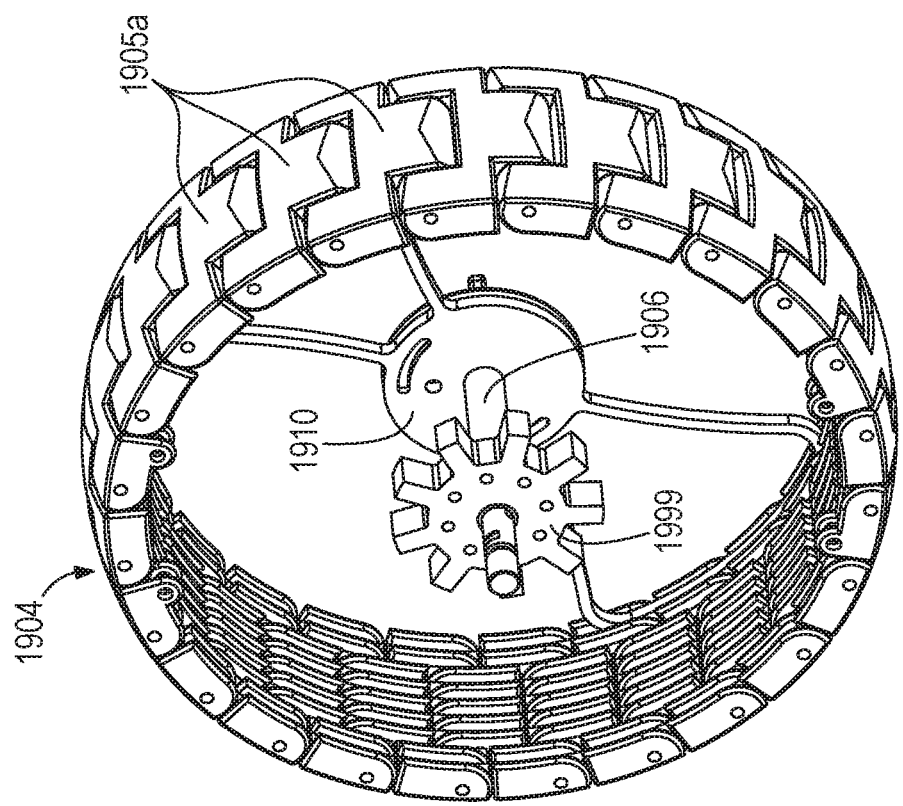
FIG. 61 shows a perspective view of the wheel of FIG. 60, illustrating an opposing side to that of FIG. 60.
Figure 60:
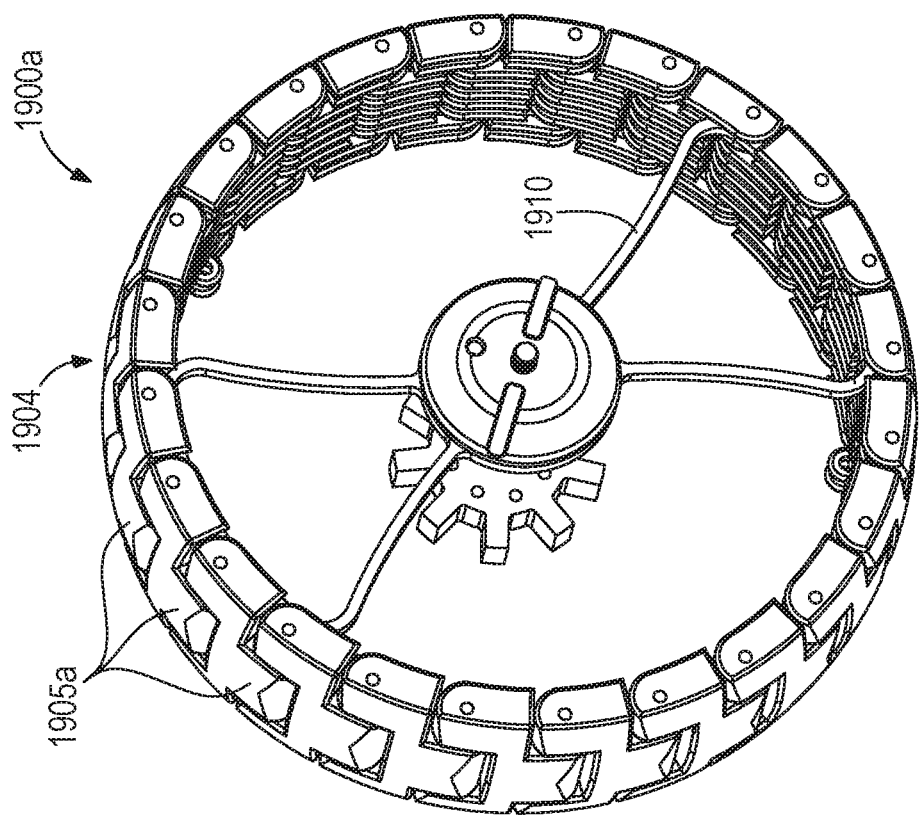
FIG. 60 shows a perspective view of the wheel of FIG. 57, with a portion of the hub assembly removed to illustrate only a single wheel section.

In order to secure the track assembly 1904 to the hub assembly 1902 when the wheel 1900 is in the collapsed position, at least one wheel section 1910*a* is secured or fixed to a portion 1986 of the track assembly 1904. Stated another way, the wheel section 1910*a* is not configured to slide within the associated groove 1936 of the track assembly 1904. FIGS. 53-54 illustrate the portion 1986 of the track assembly 1904 that is secured to the wheel section 1910*a*. The portion 1986 includes a plurality of apertures 1988 that are defined by an associated extension or protrusion 1989 that projects from ribs 1934 (or an edge of the ribs 1934) on either side of the groove 1936. The apertures 1988 are coaxially aligned on the sides of the groove 1936. Apertures or rim apertures 1990 are defined by a portion 1991 of the rim 1918 of the wheel section 1910*a* (shown in FIG. 55). When the rim 1918 of wheel section 1910*a* is positioned in the groove 1936 (such that the groove 1936 receives the rim 1918), the rim apertures 1990 are positioned into alignment with respective apertures 1988 on the ribs 1934. A securement member 1992 (shown in FIGS. 58-59) is received by the aligned apertures 1988, 1990 to secure the portion 1986 of the track assembly 1904 (and thus the track assembly 1904) to the wheel section 1910*a*. Due to the securement, the wheel section 1910*a* does not slide within the groove 1936 of the track assembly 1904. Other embodiments of the wheel 1900 can include a plurality of wheel sections 1910*a* that are secured to, and do not slide within grooves 1936 of the track assembly 1904. In addition, any of the grooves 1936 can be configured to secure the track assembly 1904 to the hub assembly 1902. Accordingly, any groove or grooves 1936 can include the plurality of protrusions 1989 that project from opposing ribs 1934 and define the aperture 1988.

Figure 56:
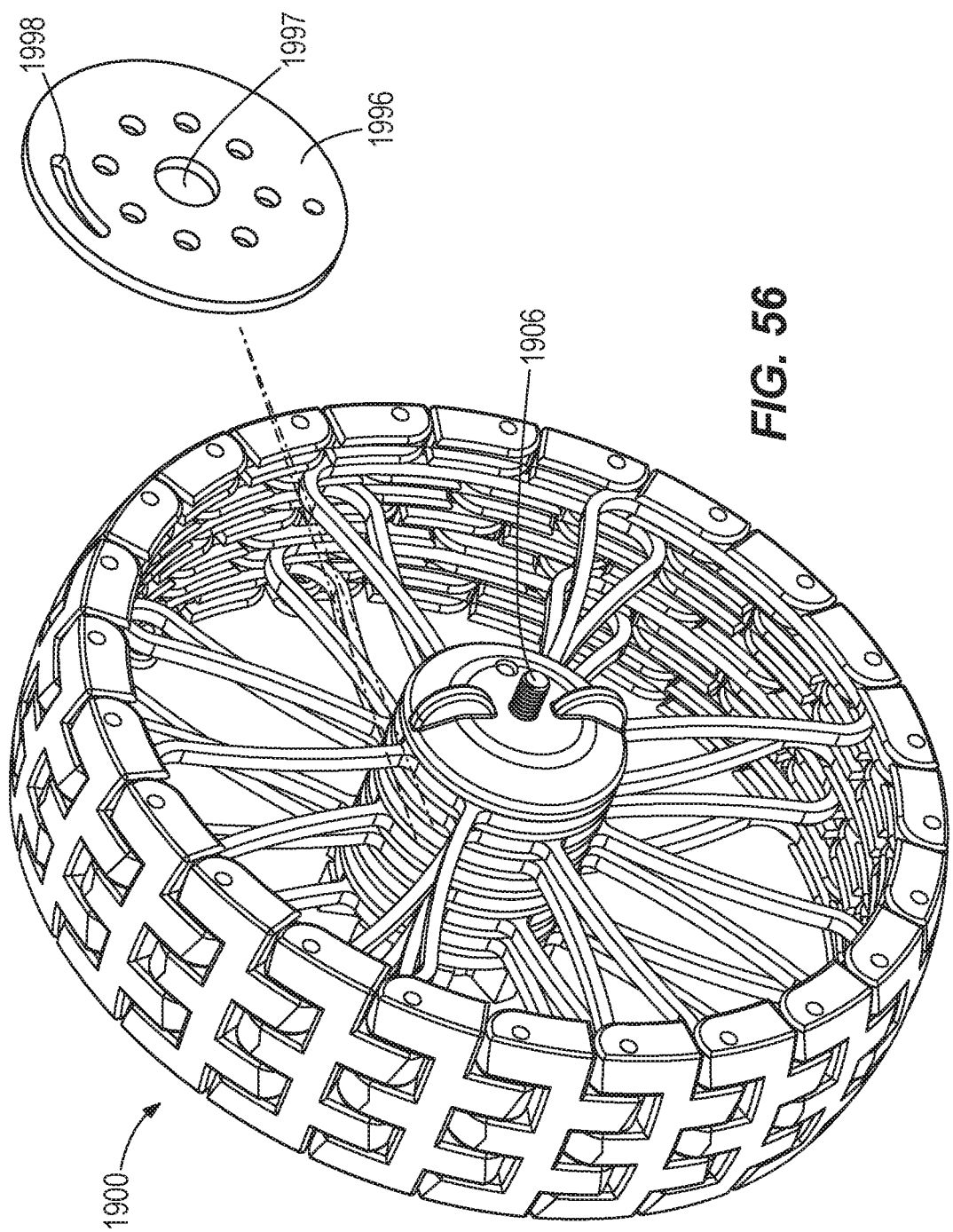
FIG. 56 shows a perspective view of the wheel of FIG. 45, illustrating a spacer that is positioned between adjacent wheel sections.
Figure 57:
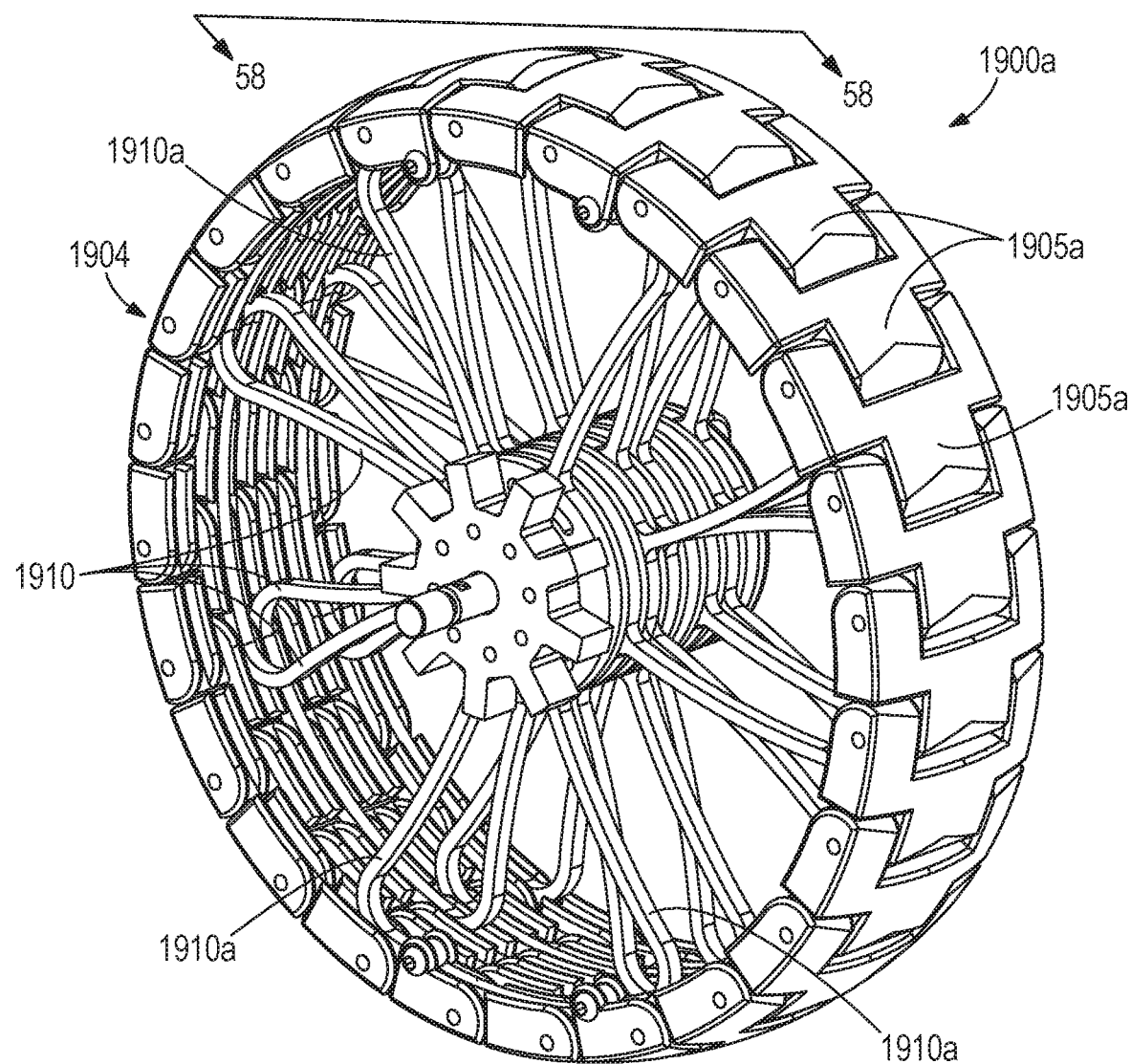
FIG. 57 shows a perspective view of another embodiment of a wheel in an expanded position and having a track assembly.

As shown in FIG. 56, a plurality of spacers 1996 can be positioned along the axle 1906 between adjacent wheel sections 1910. The spacers 1996 can have a central bore 1997 that receives a portion of the axle 1906, and a radial slot 1998 that is similarly shaped as and aligned with the radial slot 1940 (when assembled). The spacers 1996 are constructed from or coated with polytetrafluoroethylene (PTFE), or a related polymer, to reduce friction between the wheel sections 1910 as the wheel sections 1910 are rotated about the axle between the expanded and collapsed positions. In addition, the spacers 1996 can assist with maintaining correct spacing of the wheel sections 1910 within the hub assembly 1902.

It should also be appreciated that FIGS. 45-46 illustrate that four track segments 1905 engage or otherwise connect to each wheel section 1910 when in the expanded position. In other embodiments, any number of track segments 1905 can be associated with each wheel section 1910 (e.g., 1, 2, 3, 4, 5, 6, 7, 8, 9, 10, etc.).

FIGS. 57-63 illustrate an alternative embodiment of a wheel 1900*a*, which is substantially the same as the wheel 1900. Accordingly, similar parts of the wheel 1900 and the wheel 1900*a* are referred to with the same reference numbers. The wheel 1900*a* includes a track assembly 1904 that is defined by a plurality of interlocking track segments 1905*a*. In addition, the axle 1906 also carries an end member or sprocket 1999.

Figure 62:
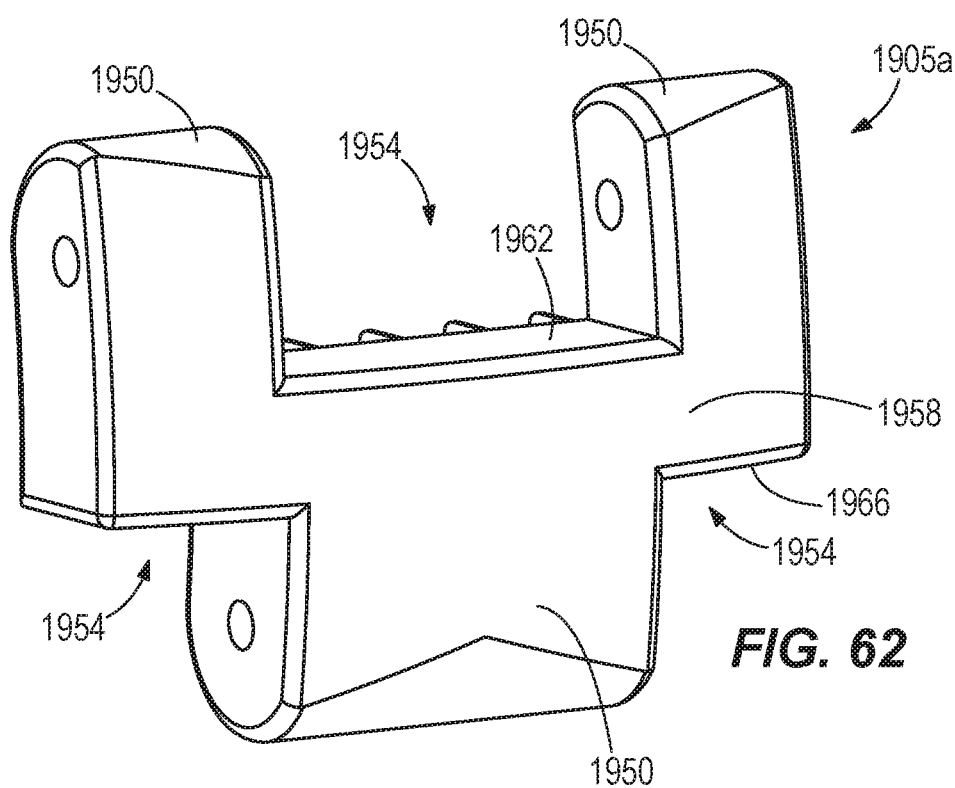
FIG. 62 shows a perspective view of an alternative track segment for use with the track assembly of the wheel of FIG. 57, illustrating an outer surface.
Figure 63:
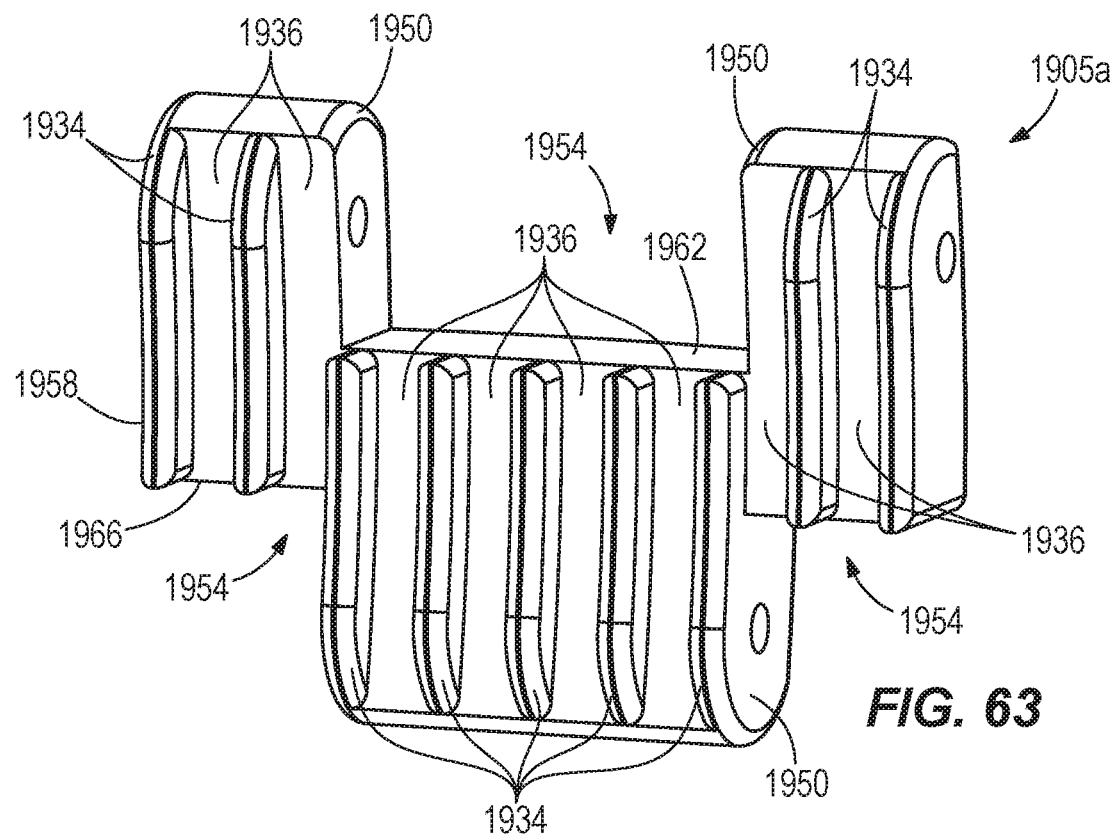
FIG. 63 shows a perspective view of the track segment of FIG. 62, illustrating an inner surface.

FIGS. 62-63 illustrate an example of the track segment 1905*a* used to define the track assembly 1904 of the wheel 1900*a*. The track segment 1905*a* has similarities to the track segment 1905, with similar parts being referred to with the same reference numbers. The track segment 1905*a* includes two projections 1950 on a first side 1962 of a central member 1958, and a single projection 1950 on a second side 1966 of the central member 1958. Accordingly, the two projections 1950 define one slot 1954 on the first side 1962, while there are two slots 1954 on the second side 1966. With reference to FIG. 63, the track segment 1905*a* defines the same number of ribs 1934 and grooves 1936 across a width of the track segment 1905*a* as the track segment 1905. However, the distribution of the ribs 1934 and grooves 1936 on each projection 1950 of track segment 1905*a* differs from track segment 1905. More specifically, the two projections 1950 on the first side 1962 of the central member 1958 each include two ribs 1934, and each define one groove 1936 a portion of a second groove 1936. The single projection 1950 on the second side 1966 of the central member 1958 includes five ribs 1934, and defines four grooves 1936. To carry the additional ribs 1934 and grooves 1936, the single projection 1950 on the second side 1966 of the central member 1958 has a width that is greater than each of the two projections 1950 on the first side 1962 of the central member 1958. In other embodiments of a track segment, each projection 1950 can have the same width or a different width. Further, each projection 1950 on a common side 1962, 1966 can have the same width or different widths. In addition, in other embodiments the number of ribs 1934 and grooves 1936 (or portions thereof) can differ or vary on each projection 1950. It should be appreciated that any number of ribs 1934 and/or grooves 1936 can be implemented or used in the wheel 1900, 1900*a*.

In operation, the wheel 1900 can be adjusted between the expanded position (shown in FIG. 45) and the collapsed position (shown in FIG. 46). To adjust the wheel 1900 between positions, a user can rotate the hub assembly 1902, such as by applying a rotational force on the handles 202, 204 of the hubcap 200. The rotation of the hubcap 200 rotates the wheel sections 1910 about the axle 1906, sliding the wheel sections 1910 (and more specifically rims 1918) within the corresponding grooves 1936 defined by the track segments 1905 of the track assembly 1904. It should be appreciated that while wheel sections 1910 rotate about the axle 1906, at least one wheel section 1910*a* does not rotate as it is secured to a portion of the track assembly 1904. This assists with maintaining a connection between the hub assembly 1902 and the track assembly 1904 (so the track assembly 1904 does not fall off of the hub assembly 1902 during adjustment between the expanded and collapsed positions).

As the wheel sections 1910 slide within the grooves 1936 of the track assembly 1904 towards the collapsed position, the wheel sections 1910 disengage and no longer support portions of the track assembly 1904. When the wheel sections 1910 are rotated about the axle 1906 into alignment (see FIG. 46), the portions of the track assembly 1904 that are no longer supported by the wheel sections 1910 collapse, transforming the wheel 1900 into the collapsed position.

As the wheel sections 1910 slide within the grooves 1936 of the track assembly 1904 towards the expanded position, the wheel sections 1910 engage and support portions of the track assembly 1904. Slots 1940 and 1998 provide the same function as slots 140, assisting to guide the distance or amount of rotation of the wheel sections 1910 about the axle 1906. When the wheel sections 1910 are completely rotated apart about the axle 1906 (see FIG. 45), the wheel 1900 is in the expanded position. This arrangement advantageously deploys the wheel sections 1910 without requiring any additional user interaction. In addition, the spaced apart wheel sections 1910 maintain a circular shape of the wheel 1900 (i.e., 360 degrees) to maintain consistent contact with the ground (or terrain or other surface engaged by the track assembly 1904).

Figure 42:
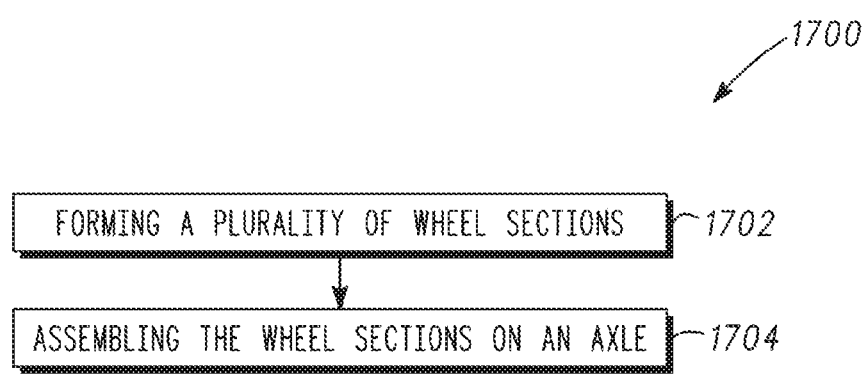
FIG. 42 shows a flow chart of a method to manufacture a wheel according to one embodiment.

Referring to FIG. 42, a method 1700 for constructing a wheel according to one example is shown. The method comprises forming a plurality of wheel sections (block 1702), and assembling the wheel sections on an axle (block 1704). The method 1700 may also include forming a tire (not shown) and/or mounting or attaching a tire on the wheel sections (not shown), and/or mounting or attaching a track assembly (or plurality of track segments) to the wheel sections (not shown). A wheel according to the disclosure may be constructed from any metal or metal alloys, plastic, composite materials, wood or a combination thereof. For example, each wheel section such as the wheel sections 110 of the wheel 100 may be formed in one piece from a plastic material by injection molding. In an injection molding process, a mold having a cavity defining a wheel section may be used. Molten plastic material is injected in the mold and cooled. The molded and cooled wheel section is then removed from the mold. The molded wheel section may also be smoothed or cleaned to remove injection molding residue. Alternatively, a wheel section may be constructed by stamping (i.e., punching using a machine press or a stamping press, blanking, embossing, bending, flanging, coining, or casting), forging, machining or a combination thereof, or other processes used for manufacturing metal, composite, plastic or wood parts. Each wheel section may be formed in one piece. Alternatively, components of each wheel section may be formed by processes and materials described herein and assembled to form the wheel section. For example, the wheel section 110 may be formed by assembling a separately manufactured hub section 212, spokes 216 and rim 218. A hub section 212, one or more spokes 216, and a rim 218 may be attached to each other by one or more adhesives, welding, soldering and/or fasteners. The disclosed materials and/or processes may be used to manufacture any of the disclosed wheel, axle and/or tire components. A tire may be manufactured from an elastic material to provide shock absorption for a pull cart to which one or more disclosed wheels are attached. A tire may be formed from rubber or other plastic materials. A tire may be formed as an inflatable tube or a solid flexible material.

Figure 43:
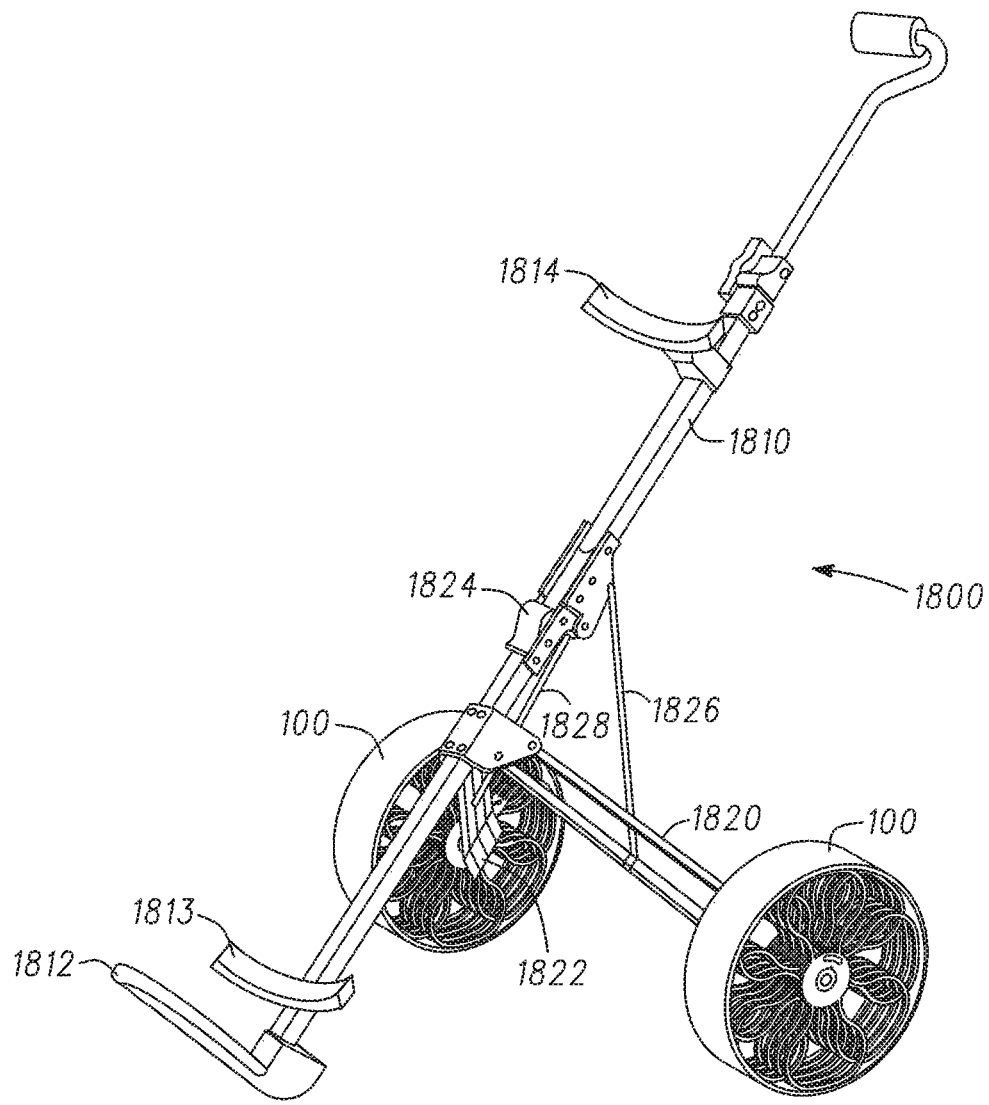
FIGS. 43 and 44 show a cart for carrying a golf club bag in deployed and stowed positions, respectively, having wheels according to one embodiment.
Figure 44:
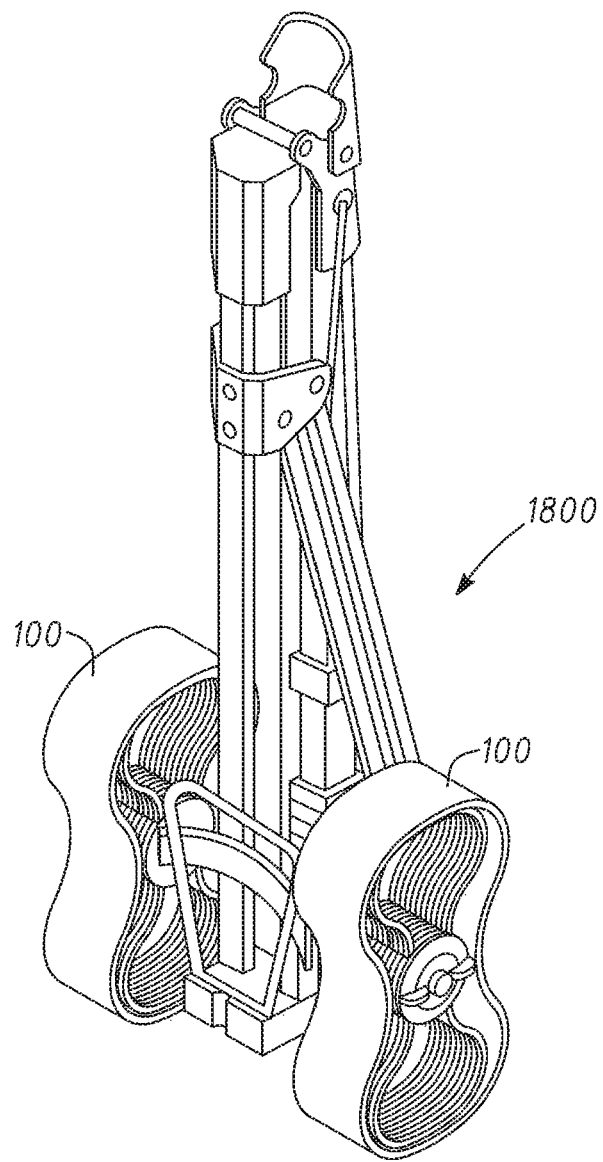

Referring to FIG. 43, a golf pull cart 1800 for supporting and transporting a golf club bag is shown having wheels 100. Although the pull cart 1800 is shown with the wheels 100, any of the wheels described herein may be used with a golf pull cart. The golf pull cart 1800 may include a frame 1810 on which a golf club bag (not shown) may be rested. The golf club bag may also be supported by a bottom support 1812, a bottom side support 1813 and a top side support 1814. The frame 1810 may also include one or more straps (not shown) for securing a golf club bag to the frame 1810. The pull cart 1800 may further include two feet 1820 in 1822 that extend outwardly from the frame 1810 opposite to each other. Each foot supports a wheel 100. The frame may also include a hinge 1824 having two hinge rods 1826 and 1828 by which the feet 1820 in 1822 may be pivoted and collapsed so that the feet 1820 and 1822 extend along the frame 1810. The frame 1810 may also collapse at the hinge so as to provide a compact golf pull cart 1800 for transportation to and from a golf course, driving range or any golf related facility. A collapsed golf pull cart 1800 is shown in FIG. 44. To further reduce the size of the golf pull cart 1800, the wheels 100 may be collapsed as described in detail herein. Furthermore, the wheels 100 may be removed from the pull cart 1800 and stored separately. Thus, using the wheels 100 or any of the wheels described herein can reduce the size of any vehicle, such as a golf pull cart, for easier storage and/or transportation. Alternatively, a golf club bag (not shown) may include attachment points or axles for directly attaching two collapsible wheels as described in detail herein to the golf club bag. For example, a golf club bag may be provided with two collapsible wheels that can be stored in one or more pockets of the golf club bag. An individual may carry the golf club bag or attach the two wheels to an axle on the golf club bag, expand the wheels, and pull the golf club bag by using the wheels. The use of collapsible wheels as described in detail herein is not limited to golf pull carts. Collapsible wheels as described in detail herein may be used for kayak carts, grocery carts, small wagons that are typically used by children, any type of luggage, luggage carts, coolers and/or any other wheeled utility cart, trailer, enclosed storage device, or a vehicle.

Although a particular order of actions is described above, these actions may be performed in other temporal sequences. For example, two or more actions described above may be performed sequentially, concurrently, or simultaneously.

Alternatively, two or more actions may be performed in reversed order. Further, one or more actions described above may not be performed at all. The apparatus, methods, and articles of manufacture described herein are not limited in this regard.

As presented above, embodiments include a wheel comprising an axle, a tire, and a plurality of wheel sections, each wheel section comprising a rim portion, a hub portion defining a rotational axis, a pair of spokes, each spoke connecting the hub portion to the rim portion of one of the wheel sections of the plurality of wheel sections, wherein the plurality of wheel sections are rotatable relative to each other about the rotational axis from a collapsed position wherein the rim portions of the plurality of wheel sections define a segment of a circle to an expanded position wherein the rim portions of the plurality of wheels sections cooperatively define the circle.

Further, the wheel can include wheel sections which are substantially fixed from rotation relative to each other in the expanded position.

Further, the tire can be configured to be mountable on the rim portions in the collapsed position or the expanded position.

Further, each rim portion of the wheel comprises a tire portion.

Further, the wheel has sections which are comprised of a radially configured slot and a pin configured to be received in the slot of another wheel section, wherein movement of the pin of one wheel section inside the slot of an adjacent wheel section defines a range of rotation of the one wheel section relative to the adjacent wheel section.

Further, the plurality of wheel sections define groups of wheel sections with each group comprising a pair of the wheel sections, and wherein the spokes of the wheel sections of each pair of wheel sections extend from the hub of the corresponding wheel section to the same rim portion.

Further, the wheel has rim portions which substantially define a path on a circumferential band around the wheel sections in the expanded position.

Further, the wheel comprises an axle configured to removably receive the hub of each wheel section by being insertable in a central bore of each wheel section being coaxial with the rotational axis of the wheel section, wherein each wheel section is rotational relative to the axle.

Further, the wheel has a tire which comprises a plurality of track segments.

Further, the wheel has a plurality of track segments which define a plurality of grooves configured to receive the wheel sections, and further configured to allow the wheel sections to move relative to the grooves.

Further, each of the track segments of the wheel include a plurality of projections that extend from a central member, the projections partially defining a plurality of slots, a first side of the central member including N number of projections, and an opposing second side of the central member including N−1 number of projections, wherein the projections on the first side are configured to engage slots of a first adjacent track segment, and the projections on the second side are configured to engage slots of a second adjacent track segment, where N may equal two.

Further, a method of manufacturing a wheel comprising forming a plurality of wheel sections shall be such that each wheel section comprises a rim portion, a hub portion defining a rotational axis, and a pair of spokes, each spoke connecting the hub portion to the rim portion of one of the wheel sections of the plurality of wheel sections, wherein the plurality of wheel sections are rotatable relative to each other about the rotational axis from a collapsed position wherein the rim portions of the plurality of wheel sections together define a segment of a circle to an expanded position wherein the rim portions of the plurality of wheel sections together define at least one full circle.

Further, the method of manufacturing the wheel shall be such that a locking mechanism configured to substantially fix the wheel sections from rotating relative to each other in the expanded position is formed.

Further, the method of manufacturing shall be such that a tire is formed which is configured to be mountable on the rim portions in the collapsed position or the expanded position.

Further, the method of manufacturing shall be such that a tire section is formed on each rim portion of the wheel.

Further, the manufacturing method shall be such that a radially configured slot and a pin are formed on each wheel section, the pin configured to be received in the slot of another wheel section, wherein movement of the pin of one wheel section inside the slot of an adjacent wheel section defines a range of rotation of the one wheel section relative to the adjacent wheel section.

Further, the method of manufacturing the wheel shall be such that the plurality of wheel sections are formed such that the spokes of two wheel sections extend from the hub of the corresponding wheel sections to the same rim portion.

Further, the method of manufacturing the wheel shall be such that the rim portions substantially define a path on a circumferential band around the wheel sections in the expanded position.

Further, the method of manufacturing the wheel shall be such that an axle configured to removably receive the hub of each wheel section by being insertable in a central bore of each wheel section being coaxial with the rotational axis of the wheel section is formed, wherein each wheel section is rotational relative to the axle.

Further, the method of manufacturing the wheel shall be such that a wheel is formed which comprises a plurality of planar hub sections stacked on top of each other to define a hub having a rotational axis, a plurality of rim portions, a plurality of spokes, each rim portion being connected to at least one of the hub portions with a spoke, wherein the hub sections are rotatable relative to each other about the rotational axis from a collapsed position wherein the rim portions form a segment of a rim of the wheel to an expanded position wherein the rim portions define the rim of the wheel, and wherein the hub sections are fixed from rotation relative to each other in the expanded position.

Further, the wheel shall comprise a tire configured to be mountable on the rim portions in the collapsed position or the expanded position.

Further, each rim portion of the wheel shall comprises a tire portion.

Further, each of the rim portions of the wheel shall extend diagonally along a circumferential band defining the rim of the wheel.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A wheel comprising:
an axle;
a plurality of wheel sections, each wheel section comprising:
a rim portion;
a hub portion defining a rotational axis; and
a pair of spokes, each spoke connecting the hub portion to the rim portion wherein the pair of spokes are within one of the wheel sections of the plurality of wheel sections; and
a tire configured to be mountable on the rim portions in a collapsed position or an expanded position;
wherein
the plurality of wheel sections are rotatable relative to each other about the rotational axis from the expanded position to the collapsed position;
wherein the rim portions of the plurality of wheel sections cooperatively define a circle in the expanded position; and
wherein the plurality of wheel sections each define a segment of the same circle;
the tire comprises a plurality of track segments each comprising an inner surface and an outer surface; and
wherein:
the inner surface of the each of the plurality track segments is configured to engage the plurality of wheel sections.

2. The wheel of claim 1 comprising the tire, wherein the inner surface of each of the plurality of track segments comprises a plurality of ribs projecting radially from the inner surface.

3. The wheel of claim 2, wherein the plurality of ribs of each of the plurality of track segments defines a plurality of grooves configured to receive the rim portion each corresponding wheel section of the plurality of wheel sections, and further configured to allow the wheel sections to move relative to the grooves.

4. The wheel of claim 2, wherein the ribs are generally parallel to one another.

5. The wheel of claim 1, wherein the plurality of track segments are interconnected to define a track assembly.

6. The wheel of claim 3, wherein each of the plurality of track segments comprise a plurality of grooves corresponding to N number of wheel sections.

7. The wheel of claim 3, wherein the grooves comprise a width ranging from 0.10 inches to 0.30 inches corresponding to a cross sectional shape of each of the plurality of rim portions.

8. The wheel of claim 6, wherein each of the plurality of track segments comprises 2 to 20 grooves.

9. The wheel of claim 1 wherein the rim portion of the plurality of wheel sections substantially defines a path on a circumferential band around the wheel sections in the expanded position.

10. The wheel of claim 9, wherein each of the track segments include a plurality of projections that extend from a central member, the projections partially defining a plurality of slots, a first side of the central member including N number of projections, and an opposing second side of the central member including N−1 number of projections, wherein the projections on the first side are configured to engage slots of a first adjacent track segment, and the projections on the opposing second side are configured to engage slots of a second adjacent track segment.

11. The wheel of claim 10, where N equals 2.

12. A wheel comprising:
an axle;
a plurality of wheel sections, each wheel section comprising:
a rim portion;
a hub portion defining a rotational axis; and
a pair of spokes, each spoke connecting the hub portion to the rim portion of one of the wheel sections of the plurality of wheel sections; and
a tire configured to be mountable on the rim portions in a collapsed position or an expanded position;
wherein
the plurality of wheel sections are rotatable relative to each other about the rotational axis from the expanded position to the collapsed position;
wherein the rim portions of the plurality of wheel sections cooperatively define a circle in the expanded position; and
wherein the plurality of wheel sections each define a segment of the circle;
the tire comprises a plurality of track segments each comprising an inner surface and an outer surface; and
wherein:
the inner surface of the each of the plurality track segments comprises a plurality of ribs.

13. The wheel of claim 12, wherein the plurality of ribs of each of the plurality of track segments defines a plurality of grooves configured to receive the rim portion of each corresponding wheel section of the plurality of wheel sections, and further configured to allow the wheel sections to move relative to the grooves.

14. The wheel of claim 12, wherein each of the track segments include a plurality of projections that extend from a central member, the projections partially defining a plurality of slots, a first side of the central member including N number of projections, and an opposing second side of the central member including N−1 number of projections, wherein the projections on the first side are configured to engage slots of a first adjacent track segment, and the projections on the opposing second side are configured to engage slots of a second adjacent track segment.

15. The wheel of claim 14, wherein N equals 2.

16. A method of manufacturing a wheel comprising:
forming an axle;
forming a plurality of wheel sections each wheel section comprising:
a rim portion;
a hub portion defining a rotation axis;
a pair of spokes, each spoke connecting the hub portion to the rim portion of one of the wheel sections of the plurality of wheel sections; and
a tire configured to be mountable on the rim portions in a collapsed position or an expanded position;
wherein
the plurality of wheel sections are rotatable relative to each other about the rotational axis from the expanded position to the collapsed position;
wherein the rim portions of the plurality of wheel sections cooperatively define a circle in the expanded position; and
wherein the plurality of wheel sections each define a segment of the circle;
the tire comprises a plurality of track segments each comprising an inner surface and an outer surface; and wherein:
the inner surface of the each of the plurality track segments comprises a plurality of ribs.

17. The method of claim 16, further comprising engaging the plurality of track segments comprising the plurality of ribs with the plurality of wheel sections.

18. The method of claim 16, wherein the plurality of ribs project radially from the plurality of track segments.

19. The method of claim 16, wherein the plurality of ribs of each of the plurality of track segments defines a plurality of grooves configured to receive the rim portion of each corresponding wheel section of the plurality of wheel sections, and further configured to allow the wheel sections to move relative to the grooves.

20. The method of claim 16, wherein the plurality of track segments are interconnected to define a track assembly.

* * * * *